US012626139B2

(12) United States Patent (10) Patent No.: US 12,626,139 B2

Mishina et al. (45) Date of Patent: May 12, 2026

(54) SECRET SOFTMAX FUNCTION CALCULATION SYSTEM, SECRET SOFTMAX FUNCTION CALCULATION APPARATUS, SECRET SOFTMAX FUNCTION CALCULATION METHOD, SECRET NEURAL NETWORK CALCULATION SYSTEM, SECRET NEURAL NETWORK LEARNING SYSTEM, AND PROGRAM

(71) Applicant: NTT, Inc., Tokyo (JP)

(72) Inventors: Ibuki Mishina, Musashino (JP); Dai Ikarashi, Musashino (JP); Koki Hamada, Musashino (JP)

(73) Assignee: NTT, Inc., Tokyo (JP)

( * ) Notice: Subject to any disclaimer, the term of this patent is extended or adjusted under 35 U.S.C. 154(b) by 1125 days.

(21) Appl. No.: 17/632,509

(22) PCT Filed: Aug. 14, 2019

(86) PCT No.: PCT/JP2019/031916
§ 371 (c)(1),
(2) Date: Feb. 3, 2022

(87) PCT Pub. No.: WO2021/029024

PCT Pub. Date: Feb. 18, 2021

(65) Prior Publication Data

US 2022/0292362 A1 Sep. 15, 2022

(51) Int. Cl.
*G06N 3/084* (2023.01)
*G06F 21/57* (2013.01)
(52) U.S. Cl.
CPC ............. *G06N 3/084* (2013.01); *G06F 21/57* (2013.01)

(58) Field of Classification Search
CPC ........ G06N 3/084; G06N 3/048; G06F 21/57; G06F 21/6245; H04L 2209/46; H04L 9/085
See application file for complete search history.

(56) References Cited

U.S. PATENT DOCUMENTS

2020/0242466 A1 * 7/2020 Mohassel ............ G06F 21/6254

OTHER PUBLICATIONS

Alkharobi, Talal Mousa. Secret sharing using artificial neural networks. Texas A&M University, 2004. (Year: 2004).*

(Continued)

*Primary Examiner* — Miranda M Huang
*Assistant Examiner* — Sidney Vincent Bostwick
(74) *Attorney, Agent, or Firm* — XSENSUS LLP

(57) ABSTRACT

Techniques for performing secure computing of softmax functions at high speed and with high accuracy are provided. A secure softmax function calculation system that calculates a share ([[softmax $(u_1)$]], . . . , [[softmax $(u_J)$]]) from a share ([[$u_1$]], . . . , [[$u_J$]]) includes a subtraction means for calculating a share ([[$u_1-u_1$]], [[$u_2-u_1$]], . . . , [[$u_J-u_1$]]), a first secure batch mapping calculation means for calculating, [[exp $(u_1-u_1)$]], [[exp $(u_2-u_1)$]], . . . , [[exp $(u_J-u_J)$]], an addition means for calculating a share $$\left(\left[\left[\sum_{j=1}^{J} \exp(u_j - u_1)\right]\right], \ldots, \left[\left[\sum_{j=1}^{J} \exp(u_j - u_J)\right]\right]\right),$$

and a second secure batch mapping calculation means for calculating a share ([[softmax $(u_1)$]], . . . , [[softmax $(u_J)$]]).

2 Claims, 9 Drawing Sheets

(56)               References Cited

OTHER PUBLICATIONS

Wagh, Sameer, Divya Gupta, and Nishanth Chandran. "SecureNN: 3-party secure computation for neural network training." Proceedings on Privacy Enhancing Technologies (2019). (Year: 2019).*

Rouhani, Bita Darvish, M. Sadegh Riazi, and Farinaz Koushanfar. "Deepsecure: Scalable provably-secure deep learning." Proceedings of the 55th annual design automation conference. 2018. (Year: 2018).*

Mohassel et al., "SecureML: A System for Scalable Privacy-Preserving Machine Learning", IEEE Symposium on Security and Privacy, 2017, pp. 19-38.

Wagh et al., "SecureNN: 3-Party Secure Computation for Neural Network Training", Proceedings on Privacy Enhancing Technologies, 2019, 24 pages.

* cited by examiner

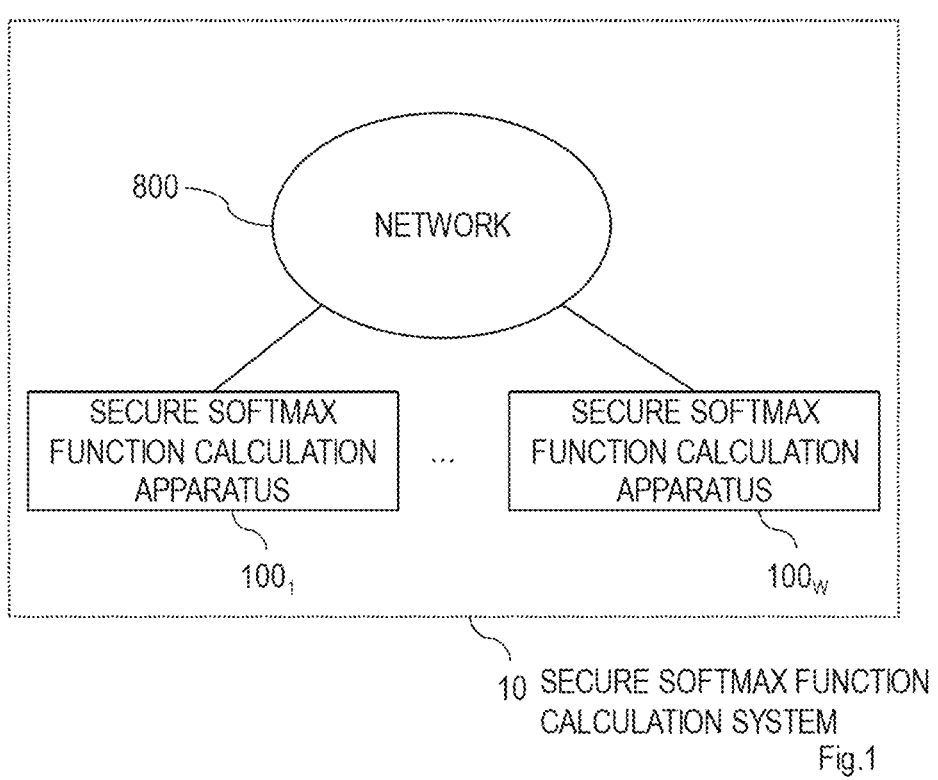

800

NETWORK

| SECURE SOFTMAX FUNCTION CALCULATION APPARATUS | ... | SECURE SOFTMAX FUNCTION CALCULATION APPARATUS |

$100_1$     $100_W$

10 SECURE SOFTMAX FUNCTION CALCULATION SYSTEM

Fig.1

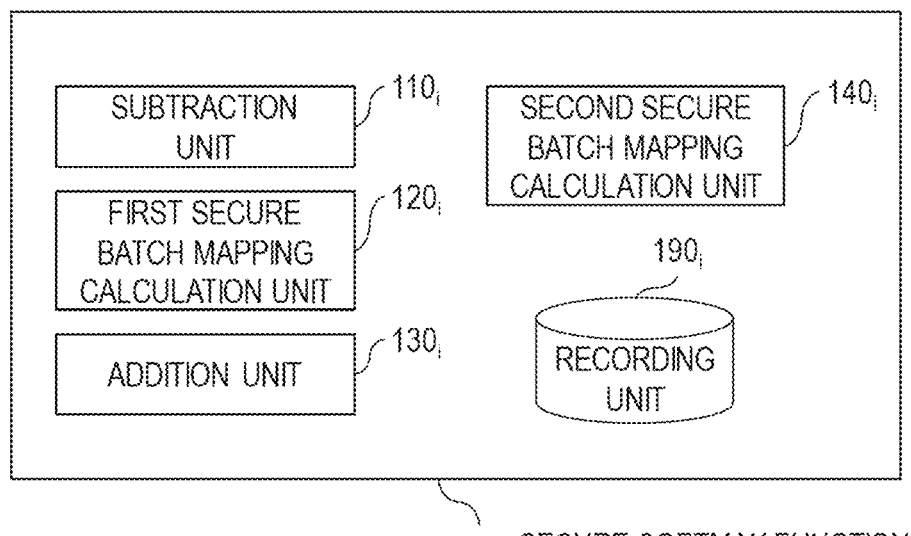

SUBTRACTION UNIT     $110_i$

SECOND SECURE BATCH MAPPING CALCULATION UNIT     $140_i$

FIRST SECURE BATCH MAPPING CALCULATION UNIT     $120_i$ $190_i$

ADDITION UNIT     $130_i$

RECORDING UNIT $100_i$ SECURE SOFTMAX FUNCTION CALCULATION APPARATUS

Fig.2

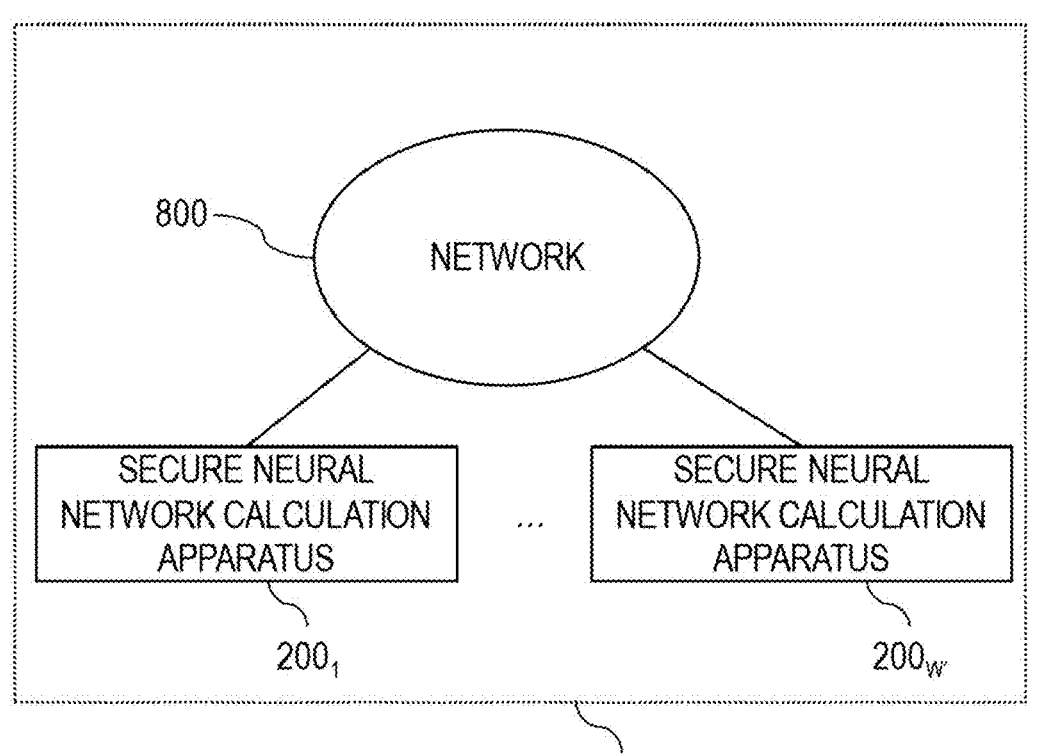

800

NETWORK

SECURE NEURAL NETWORK CALCULATION APPARATUS

...

SECURE NEURAL NETWORK CALCULATION APPARATUS $200_1$ $200_W$

20 SECURE NEURAL NETWORK CALCULATION SYSTEM

Fig.4

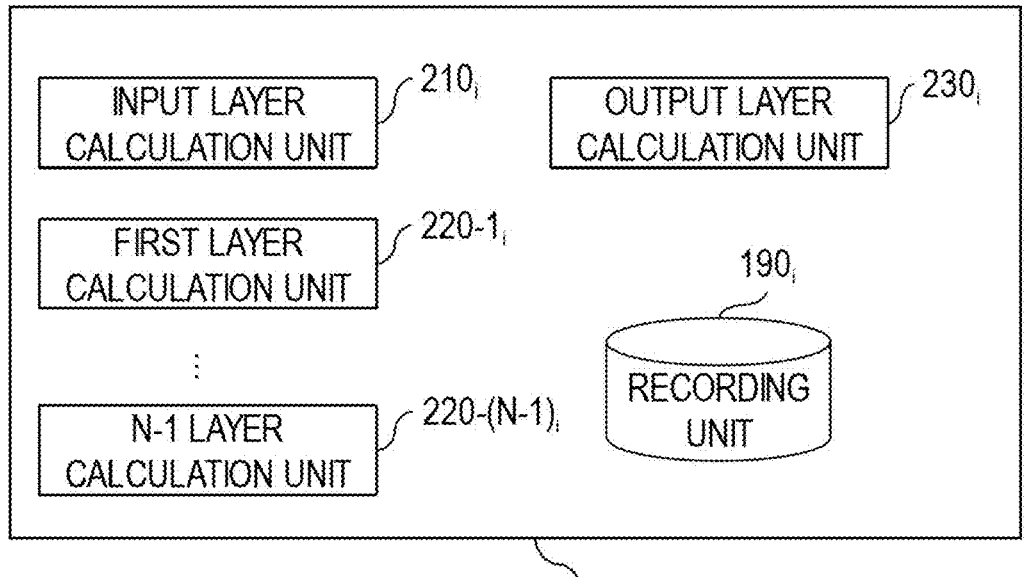

INPUT LAYER CALCULATION UNIT  $210_i$

OUTPUT LAYER CALCULATION UNIT  $230_i$

FIRST LAYER CALCULATION UNIT  $220\text{-}1_i$ $190_i$

RECORDING UNIT

N-1 LAYER CALCULATION UNIT  $220\text{-}(N\text{-}1)_i$ $200_i$ SECURE NEURAL NETWORK CALCULATION APPARATUS

Fig.5

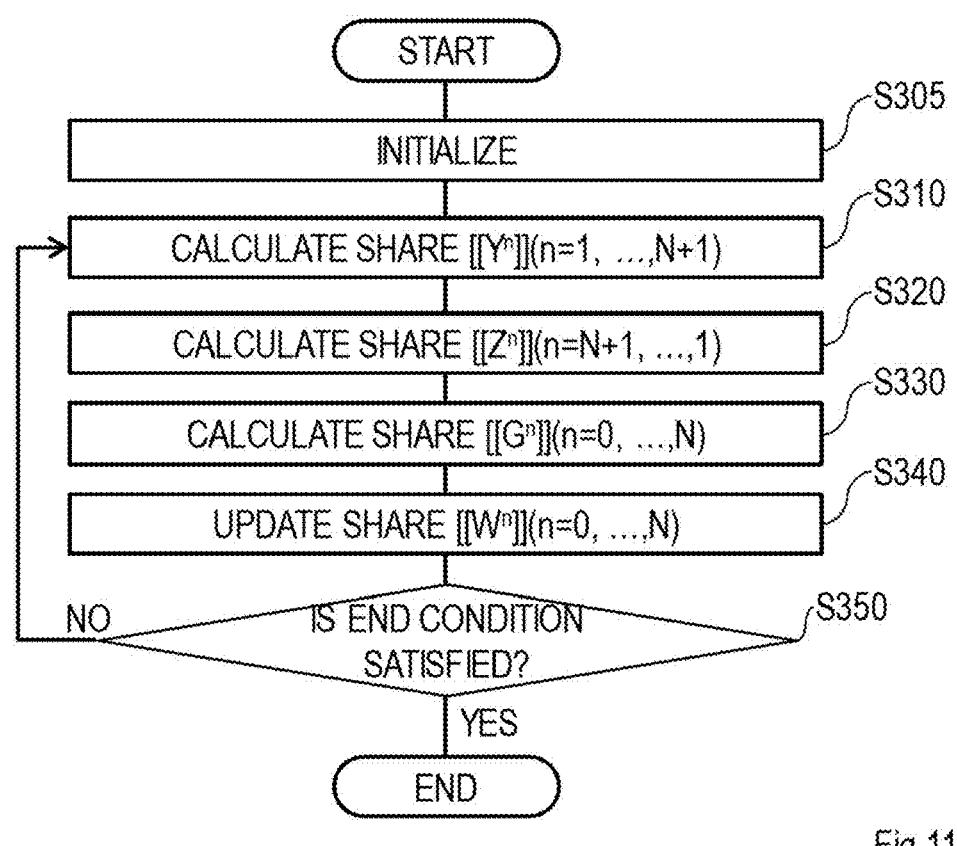

START

S305 — INITIALIZE

S310 — CALCULATE SHARE $[[Y^n]](n=1, ..., N+1)$

S320 — CALCULATE SHARE $[[Z^n]](n=N+1, ..., 1)$

S330 — CALCULATE SHARE $[[G^n]](n=0, ..., N)$

S340 — UPDATE SHARE $[[W^n]](n=0, ..., N)$

S350 — IS END CONDITION SATISFIED?    NO

YES

END

Fig.11

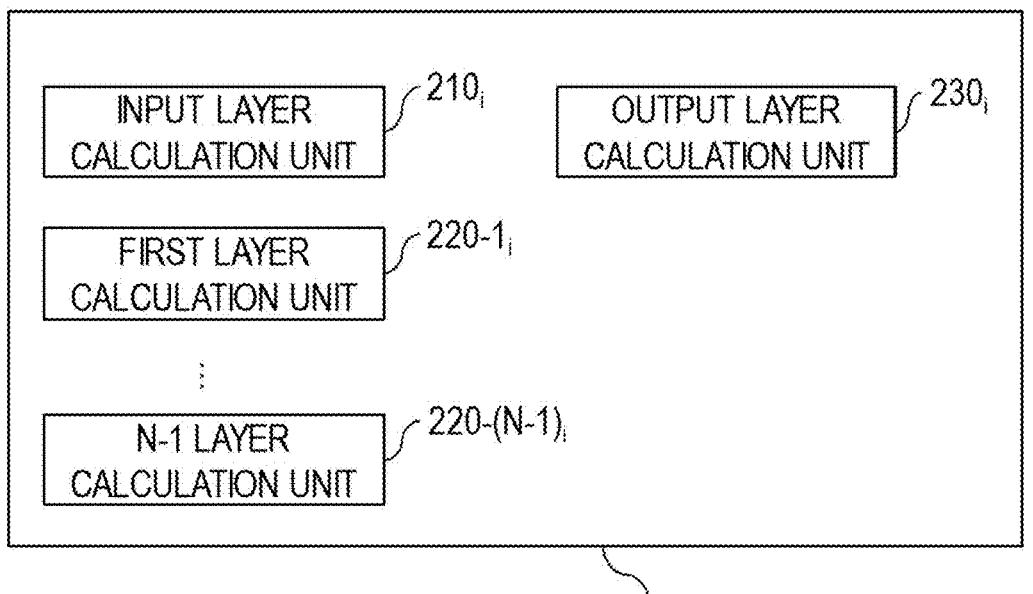

INPUT LAYER CALCULATION UNIT — $210_i$

OUTPUT LAYER CALCULATION UNIT — $230_i$

FIRST LAYER CALCULATION UNIT — $220\text{-}1_i$

N-1 LAYER CALCULATION UNIT — $220\text{-}(N\text{-}1)_i$ $310_i$ FORWARD PROPAGATION CALCULATION UNIT

Fig.12

SECRET SOFTMAX FUNCTION CALCULATION SYSTEM, SECRET SOFTMAX FUNCTION CALCULATION APPARATUS, SECRET SOFTMAX FUNCTION CALCULATION METHOD, SECRET NEURAL NETWORK CALCULATION SYSTEM, SECRET NEURAL NETWORK LEARNING SYSTEM, AND PROGRAM

CROSS-REFERENCE TO RELATED APPLICATION

The present application is based on PCT filing PCT/JP2019/031916, filed Aug. 14, 2019, the entire contents of which are incorporated herein by reference.

TECHNICAL FIELD

The present invention relates to secure computing techniques, and particularly relates to techniques for secure computing of softmax functions.

BACKGROUND ART

Conventional methods for secure computing of softmax functions include SecureML described in NPL 1 and SecureNN described in NPL 2. Here, softmax functions are non-linear functions represented by the following equation.

[Math. 1]

$$\text{softmax}(u_i) = \frac{\exp(u_i)}{\sum_{j-1}^{J} \exp(u_j)} \tag{1}$$

Secure computing is a method for obtaining an arithmetic result of a specified operation without restoring encrypted numerical values (for example, see Reference NPL 1). In the method of Reference NPL 1, an encryption is performed to distribute a plurality of pieces of information that can restore a numerical value to three secure computing devices, and results of addition and subtraction, constant sum, multiplication, constant times, logic operations (NOT, AND, OR, XOR), data format conversions (integer number, binary number) can be kept distributed or kept encrypted in the three secure computing devices without restoring the numerical value. Generally, the number of distribution is not limited to 3 but can be W (W is a predetermined constant greater than or equal to 3), and a protocol that implements secure computing by coordinated calculation with W secure computing devices is referred to as a multi-party protocol. (Reference NPL 1: Koji Chida, Koki Hamada, Dai Ikarashi, Katsumi Takahashi, "A Lightweight Three-party Secure Function Evaluation with Error Detection and Its Experimental Result," In CSS, 2010.)

CITATION LIST

Non Patent Literature

NPL 1: Payman Mohassel and Yupeng Zhang, "SecureML: A System for Scalable Privacy-Preserving Machine Learning", 2017 IEEE Symposium on Security and Privacy, pp. 19-38, 2017.

NPL 2: Sameer Wagh, Divya Gupta, and Nishanth Chandran, "SecureNN: 3-Party Secure Computation for Neural Network Training", Proceedings on Privacy Enhancing Technologies; 2019 (3): 26-49, 2019.

SUMMARY OF THE INVENTION

Technical Problem

However, as can be seen from Equation (1), softmax functions include calculation of exponential functions and divisions that secure computing is not good at, so it is not easy to perform secure computing while ensuring both processing speed and accuracy. Conventionally, a function ReLU $(x)=\max (0, x)$ is used for the approximation of an exponential function exp $(x)$, so the approximation accuracy is low, and in particular, the greater the value of x is, the greater the error is, and the lower the accuracy of the calculation of softmax functions is.

Thus, an object of the present invention is to provide techniques for performing secure computing of softmax functions at high speed and with high accuracy.

Means for Solving the Problem

An aspect of the present invention is a secure softmax function calculation system for calculating a share ([[softmax $(u_1)$]], . . . , [[softmax $(u_J)$]]) of a value (softmax $(u_1)$, . . . , softmax $(u_J)$) of a softmax function for an input vector $(u_1, \ldots, u_J)$ from a share ([[$u_1$]], . . . , [[$u_J$]]) of the input vector $(u_1, \ldots, u_J)$ (where J is an integer greater than or equal to 1), the secure softmax function calculation system being constituted with three or more secure softmax function calculation apparatuses, map$_1$ being secure batch mapping defined by a parameter $(a_1, \ldots, a_K)$ representing a domain of definition and a parameter $(\alpha_1, \ldots, \alpha_K)$ representing a range of values (where K is an integer greater than or equal to 2, $a_1, \ldots, a_K$ are real numbers that meet $a_1 < \ldots, < a_K$) of a function exp $(x)$, and map$_2$ being secure batch mapping defined by a parameter $(b_1, \ldots, b_L)$ representing a domain of definition and a parameter $(\beta_1, \ldots, \beta_L)$ representing a range of values (where L is an integer greater than or equal to 2, $b_1, \ldots, b_L$ are real numbers that meet $b_1 < \ldots < b_L$) of a function 1/x, the secure softmax function calculation system including: a subtraction means for calculating a share ([[$u_1-u_1$]], [[$u_2-u_1$]], . . . , [[$u_J-u_1$]], [[$u_1-u_2$]], . . . , [[$u_J-u_2$]], . . . , [[$u_1-u_J$]], . . . , [[$u_J-u_J$]]) from the share ([[$u_1$]], . . . , [[$u_J$]]); a first secure batch mapping calculation means for calculating map$_1$ (([[$u_1-u_1$]], [[$u_2-u_1$]], . . . , [[$u_J-u_1$]], [[$u_1-u_2$]], . . . , [[$u_J-u_2$]], . . . , [[$u_1-u_J$]], . . . , [[$u_J-u_J$]]))=([[$\alpha_{f(1, 1)}$]], [[$\alpha_{f(2, 1)}$]], . . . , [[$\alpha_{f(J, 1)}$]], [[$\alpha_{f(1, 2)}$]], . . . , [[$\alpha_{f(J, 2)}$]], . . . , [[$\alpha_{f(1, J)}$]], . . . , [[$\alpha_{f(J, J)}$]]) from the share ([[$u_1-u_1$]], [[$u_2-u_1$]], . . . , [[$u_J-u_1$]], [[$u_1-u_2$]], . . . , [[$u_J-u_2$]], [[$u_1-u_J$]], . . . , [[$u_J-u_J$]]) (where f(i, j) $(1 \le i, j \le K)$ is p where $a_p \le u_i-u_j < a_{p+1}$) to make ([[exp $(u_1-u_1)$]], [[exp $(u_2-u_1)$]], . . . , [[exp $(u_J-u_1)$]], [[exp $(u_1-u_2)$]], . . . , [[exp $(u_J-u_2)$]], . . . , [[exp $(u_1-u_J)$]], . . . , [[exp $(u_J-u_J)$]]))=([[$\alpha_{f(1, 1)}$]], [[$\alpha_{f(2, 1)}$]], . . . , [[$\alpha_{f(J, 1)}$]], [[$\alpha_{f(1, 2)}$]], . . . , [[$\alpha_{f(J, 2)}$]], . . . , [[$\alpha_{f(1, J)}$]], . . . , [[$\alpha_{f(J, J)}$]]); an addition means for calculating a share $$\left( \left[ \left[ \sum\nolimits_{j=1}^{J} \exp(u_j - u_1) \right] \right], \left[ \left[ \sum\nolimits_{j=1}^{J} \exp(u_j - u_2) \right] \right], \ldots, \left[ \left[ \sum\nolimits_{j=1}^{J} \exp(u_j - u_J) \right] \right] \right)$$

from the share ([[exp $(u_1-u_1)$]], [[exp $(u_2-u_1)$]], . . . , [[exp $(u_J-u_1)$]], [[exp $(u_1-u_2)$]], . . . , [[exp $(u_J-u_2)$]], . . . , [[exp $(u_1-u_J)]]$, . . . , $[[\exp(u_J-u_J)]])$; and a second secure batch mapping calculation means for calculating map$_2$ $$\left(\left[\left[\sum_{j=1}^{J}\exp(u_j-u_1)\right]\right], \left[\left[\sum_{j=1}^{J}\exp(u_j-u_2)\right]\right],\right.$$

$$\left.\cdots, \left[\left[\sum_{j=1}^{J}\exp(u_j-u_J)\right]\right]\right)=([[\beta_{g(1)}]], [[\beta_{g(2)}]], \ldots, [[\beta_{g(J)}]])$$

from the share $$\left(\left[\left[\sum_{j=1}^{J}\exp(u_j-u_1)\right]\right], \left[\left[\sum_{j=1}^{J}\exp(u_j-u_2)\right]\right], \ldots, \left[\left[\sum_{j=1}^{J}\exp(u_j-u_J)\right]\right]\right)$$

(where g(i) ($1\le i\le L$) is p where $$b_p \le \sum_{j=1}^{J}\exp(u_j-u_i) < b_{p+1}$$

to make $([[\text{softmax}(u_1)]], [[\text{softmax}(u_2)]], \ldots, [[\text{softmax}(u_J)]])=([[\beta_{g(1)}]], [[\beta_{g(2)}]], \ldots, [[\beta_{g(J)}]])$.

Effects of the Invention

According to the present invention, it is possible to perform secure computing of softmax functions at high speed and with high accuracy.

BRIEF DESCRIPTION OF DRAWINGS

FIG. 1 is a block diagram illustrating a configuration of a secure softmax function calculation system 10.

FIG. 2 is a block diagram illustrating a configuration of a secure softmax function calculation apparatus 100$_i$.

FIG. 4 is a block diagram illustrating a configuration of a secure neural network calculation system 20.

FIG. 5 is a block diagram illustrating a configuration of a secure neural network calculation apparatus 200$_i$.

FIG. 11 is a flowchart illustrating an operation of the secure neural network learning system 30.

FIG. 12 is a block diagram illustrating a configuration of a forward propagation calculation unit 310$_i$.

DESCRIPTION OF EMBODIMENTS

Figure 3:
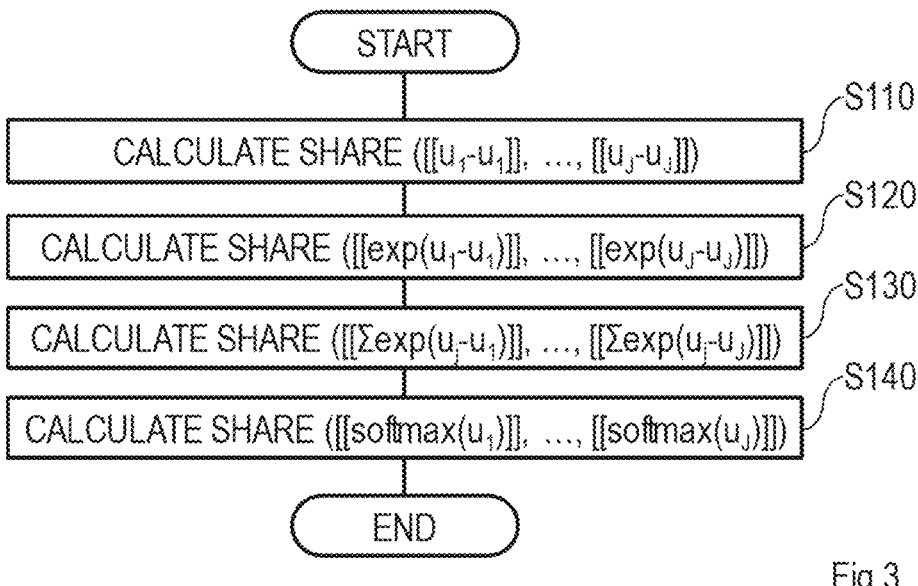
FIG. 3 is a flowchart illustrating an operation of the secure softmax function calculation system 10.

Hereinafter, embodiments of the present invention will be described in detail.

Components having the same function are denoted by the same reference signs, and redundant description thereof will be omitted.

Prior to describing each embodiment, the method of notation herein will be described.

_ (underscore) represents the subscript. For example, $x^{y\_z}$ represents $y_z$ is the superscript to x, and $x_{y\_z}$ represents $y_z$ is the subscript to x.

A superscript "^" or "~", such as ^x or ~x to a character x, should be described otherwise above "x", but are described as ^x or ~x, under the limitations of the written description herein.

Technical Background

<<Preparation>>

The secure computing in the embodiments of the invention of the present application are built up in combination of existing operations of secure computing. The operations required for the secure computing are concealment, addition, multiplication, secure batch mapping, and right shift. Each of the operations will be described below.

[Concealment]

$[[x]]$ is a value concealed by secret sharing of x (hereinafter referred to as a share of x). Any method can be used for the secret sharing method. For example, Shamir secret sharing on GF ($2^{61}-1$), or replicated secret sharing on $Z_2$ may be used.

Multiple secret sharing methods may be used in combination in one algorithm. In this case, the components are converted to each other as appropriate.

For an N-dimensional vector $\overrightarrow{x}=(x_1, \ldots, x_N)$, $[[\overrightarrow{x}]]:=([[x_1]], \ldots, [[x_N]])$. In other words, $[[\overrightarrow{x}]]$ is a vector where the share $[[x_n]]$ of the n-th element $x_n$ of $\overrightarrow{x}$ is the n-th element. Similarly, for M×N matrix $A=(a_{m,n})$ ($1\le m\le M$, $1\le n\le N$), $[[A]]$ is a matrix where the share $[[a_{m,N}]]$ of the (m, n) element $a_{m,n}$ of A is the element (m, n). Here, a:=b represents that a is defined by b.

Note that x is a plaintext of $[[x]]$.

Methods for determining $[[x]]$ from x (concealment) and methods for determining x from $[[x]]$ (restoration) specifically include methods described in Reference NPL 1 and Reference NPL 2.

(Reference NPL 2: Shamir, A., "How to share a secret", Communications of the ACM, Vol. 22, No. 11, pp. 612-613, 1979.)

[Addition and Multiplication]

An addition $[[x]]+[[y]]$ by secure computing outputs $[[x+y]]$ with $[[x]]$ and $[[y]]$ as inputs. A multiplication $[[x]]\times[[y]]$ (also represented as mul ($[[x]]$, $[[y]]$)) by secure computing outputs $[[x\times y]]$ with $[[x]]$ and $[[y]]$ as inputs.

Note that any of $[[x]]$ and $[[y]]$ may be a value not concealed (hereinafter referred to as a "public value"). For example, with $\beta$ and $\gamma$ as public values, $[[x+\beta]]$ can be output with $[[x]]$ and $\beta$ as inputs, or $[[\gamma\times y]]$ can be output with $\gamma$ and $[[y]]$ as inputs.

Specific methods of addition and multiplication include methods described in Reference NPL 3 and Reference NPL 4.

(Reference NPL 3: Ben-Or, M., Goldwasser, S. and Wigderson, A., "Completeness theorems for non-cryptographic fault-tolerant distributed computation", Proceedings of the twentieth annual ACM symposium on Theory of computing, ACM, pp. 1-10, 1988.)

(Reference NPL 4: Gennaro, R., Rabin, M. O. and Rabin, T., "Simplified VSS and fast-track multiparty computations with applications to threshold cryptography", Proceedings of the seventeenth annual ACM symposium on Principles of distributed computing, ACM, pp. 101-111, 1998.)

[Secure Batch Mapping]

A secure batch mapping is a function of calculating a lookup table, which is a technique that can arbitrarily define the domain of definition and range of values of functions to be calculated. The secure batch mapping performs processing in a vector unit, so the secure batch mapping has a property that it is effective in performing the same processing on a plurality of inputs. The secure batch mapping is a function defined as follows.

The secure batch mapping map is to output a share that maps a share of each element of the vector, i.e., $[[\overrightarrow{y}]]:= ([[y_1]], \ldots, [[y_N]])$ such that $a_p \leq x_n < a_{p+1}$ and $y_n = b_p$ for $1 \leq n \leq N$, by using a parameter $(a_1, \ldots, a_K)$ representing a domain of definition and a parameter $(b_1, \ldots, b_K)$ representing a range of values of a function $f(x)$ (where $a_1, \ldots, a_K, b_1, \ldots, b_K$ are real numbers, and meet $a_1 < \ldots < a_K$), with a share $[[\overrightarrow{x}]] = ([[x_1]], \ldots, [[x_N]])$ of a vector $\overrightarrow{x} = (x_1, \ldots, x_N)$ as an input.

For example, the algorithm of the secure batch mapping described in NPL 5 can be used.

(Reference NPL 5: Koki Hamada, Dai Ikarashi, Koji Chida, "A Batch Mapping Algorithm for Secure Function Evaluation," IEICE Transactions A, Vol. J96-A, No. 4, pp. 157-165, 2013.)

[Right Shift]

The right shift rshift is to output $[[\overrightarrow{y}]]:= ([[y_1]], \ldots, [[y_N]])$ in which each element $[[x_n]]$ of the share $[[\overrightarrow{x}]]$ is arithmetic right shifted by t bits, with the share $[[\overrightarrow{x}]] = ([[x_1]], \ldots, [[x_N]])$ of the vector $\overrightarrow{x} = (x_1, \ldots, x_N)$ and a public value t as inputs. Here, the arithmetic right shift is a shift that performs padding on the left side by code bits rather than 0. By using a logical right shift rlshift, rshift $([[A \times 2^n]], n-m) = [[A \times 2^m]]$ can be calculated as the following equation (see NPL 6).

$$\lceil\lceil A' \times 2^n \rceil\rceil = \lceil\lceil A \times 2^n \rceil\rceil + a \times 2^n \ (a \geq |A|)$$

$$[[A' \times 2^m]] = \text{rlshift}([[A' \times 2^n]], n-m)$$

$$\|A \times 2^m\| = \|A' \times 2^m\| - a \times 2^m \qquad \text{[Math. 2]}$$

(Reference NPL 6: Ibuki Mishina, Dai Ikarashi, Koki Hamada, Ryo Kikuchi. "Designs and Implementations of Efficient and Accurate Secret Logistic Regression," In CSS, 2018.)

<<Secure Computing of Softmax Function by Secure Batch Mapping>>

In the embodiments of the invention of the present application, secure batch mapping is used to calculate softmax functions while keeping vector $(u_1, \ldots, u_J)$ concealed. Because softmax functions have a plurality of inputs as can be seen from Equation (1), softmax functions have good compatibility with the nature of secure batch mapping, which is processed in vector units. However, because the processing time of the secure batch mapping is proportional to the size of the lookup table (domain of definition or range of values), the calculation accuracy and processing speed are in a trade-off relationship.

Specifically, in the embodiments of the invention of the present application, a secure batch mapping $map_1$ that calculates a function exp (x) and a secure batch mapping $map_2$ that calculates a function 1/x are used to implement secure computing of softmax functions. To do so, instead of Equation (1), the following equation is considered by dividing both the denominator and the numerator of Equation (1) by exp $(u_i)$.

[Math. 3]

$$\text{softmax}(u_i) = \frac{\exp(u_i)}{\sum_{j=1}^{J} \exp(u_j - u_i)} \qquad (1)'$$

Then, a share $[[\text{softmax}(u_i)]]$ of a value softmax $(u_i)$ of a softmax function is calculated by the following procedure.

(1) First, $[[u_j - u_i]]$ is calculated for $j=1, 2, \ldots, J$.

(2) Next, $([[u_1 - u_i]], [[u_2 - u_i]], \ldots, [[u_J - u_i]]$ is input to the secure batch mapping $map_1$, and $([[\exp(u_1 - u_i)]], [[\exp(u_2 - u_i)]], \ldots, [[\exp(u_J - u_i)]])$ is obtained as output results.

(3)

$$\left[\left[\sum_{j=1}^{J} \exp(u_j - u_i)\right]\right]$$

is obtained by adding all the output results of (2) $([[\exp(u_1 - u_i)]], [[\exp(u_2 - u_i)]], \ldots, [[\exp(u_J - u_i)]])$.

(4) Finally, addition results $$\left[\left[\sum_{j=1}^{J} \exp(u_j - u_i)\right]\right]$$

is input to the secure batch mapping $map_2$, and $[[\text{softmax}(u_i)]]$ is obtained.

Here, in a case where the processing of (1) to (4) described above is performed on all $i=1, 2, \ldots, J$, by the secure batch mapping $map_1$ and the secure batch mapping $map_2$, $([[\exp(u_1 - u_1)]], [[\exp(u_2 - u_1)]], \ldots, [[\exp(u_J - u_1)]], [[\exp(u_1 - u_2)]], \ldots, [[\exp(u_J - u_2)]], \ldots, [[\exp(u_1 - u_J)]], [[\exp(u_J - u_J)]])$ and $$\left[\left[1 \Big/ \sum_{j=1}^{J} \exp(u_j - u_1)\right]\right], \left[\left[1 \Big/ \sum_{j=1}^{J} \exp(u_j - u_2)\right]\right],$$

$$\ldots, \left[\left[1 \Big/ \sum_{j=1}^{J} \exp(u_j - u_J)\right]\right]$$

can be calculated together, and the calculation of $([[\text{softmax}(u_1)]], \ldots, [[\text{softmax}(u_J)]]$ can be implemented very efficiently. In other words, by the computation of the two secure batch mapping, the secure computing of the softmax function that calculates $([[\text{softmax}(u_1)]], \ldots, [[\text{softmax}(u_J)]])$ from $([[u_1]], \ldots, [[u_J]])$ can be implemented.

<<Devise on Design of LookUp Table>>

As described above, the calculation accuracy and the processing speed of softmax functions are in a trade-off relationship. Thus, in order to increase the processing speed while maintaining a degree of calculation accuracy, a lookup table of an appropriate size needs to be designed, i.e., parameters representing the domain of definition and parameters representing the range of values need to be set. Thus, for the appropriate design of the lookup table, the nature of "softmax function satisfying $0 \leq \text{softmax}(u_i) \leq 1$" is utilized.

From the above nature, it can be seen that the range of values of the secure batch mapping $map_2$ that calculates the function 1/x is [0, 1], and thus a lookup table where the range of values of the secure batch mapping $map_2$ is [0, 1] is to be created. Thus, in a case where fixed point arithmetic is used to perform secure computing, and where by is the number of bits in the fractional portion of the fixed point representing the accuracy of the output of the softmax function, the size of the lookup table is $2^{b-y}$.

At this time, the minimum value of the output that can be represented by the accuracy $b_y$ bits is $\frac{1}{2}^{b-y}$, and the input at that time is $2^{b-y}$. Thus, it can be seen that the maximum value of the output of the secure batch mapping $map_1$ that calculates the function exp (x) is $2^{b-y}$. This is because even if a larger value can be calculated, the value obtained by inputting the value into the secure batch mapping $map_2$ that calculates the function 1/x is the same as the case where $2^{b-y}$ is input. Thus, the range of values of the secure batch mapping $map_1$ that calculates the function exp (x) is [0, $2^{b-y}$].

In this way, by utilizing the nature that the value of the softmax function is limited to [0, 1], the embodiments of the invention of the present application can design a lookup table of an appropriate size, and can efficiently perform secure computing of a softmax function using secure batch mapping.

First Embodiment

A secure softmax function calculation system 10 will be described below with reference to FIGS. 1 to 3. FIG. 1 is a block diagram illustrating a configuration of the secure softmax function calculation system 10. The secure softmax function calculation system 10 includes W (where W is a predetermined integer greater than or equal to 3) secure softmax function calculation apparatuses $100_1, \ldots, 100_W$. The secure softmax function calculation apparatuses $100_1, \ldots, 100_W$ are connected to a network 800 and are capable of communicating with each other. The network 800 may be, for example, a communication network such as the Internet or a broadcast communication path. FIG. 2 is a block diagram illustrating a configuration of a secure softmax function calculation apparatus $100_i$ ($1 \leq i \leq W$). FIG. 3 is a flowchart illustrating an operation of the secure softmax function calculation system 10.

As illustrated in FIG. 2, the secure softmax function calculation apparatus $100_i$ includes a subtraction unit $110_i$, a first secure batch mapping calculation unit $120_i$, an addition unit $130_i$, a second secure batch mapping calculation unit $140_i$, and a recording unit $190_i$. Each of the components of the secure softmax function calculation apparatus $100_i$ excluding the recording unit $190_i$ is configured such that operations required for the secure computing, specifically, operations required to implement functions of each of the components among at least concealment, addition, multiplication, secure batch mapping, and right shift, can be executed. Specific functional configurations for implementing individual operations in the present invention are sufficient to be configurations such that the algorithms disclosed in, for example, each of the reference NPL 1 to 6 can be executed, and these are conventional configurations, so the detailed description thereof will be omitted. The recording unit $190_i$ is a component that records information required for processing executed by the secure softmax function calculation apparatus $100_i$. For example, the recording unit $190_i$ records a parameter $(a_1, \ldots, a_K)$ representing a domain of definition and a parameter $(\alpha_1, \ldots, \alpha_K)$ representing a range of values (where K is an integer greater than or equal to 2, $a_1, \ldots, a_K$ are real numbers that meet $a_1 < \ldots < a_K$) of a function exp (x) required for definition of a secure batch mapping $map_1$, and a parameter $(b_1, \ldots, b_L)$ representing a domain of definition and a parameter $(\beta_1, \ldots, \beta_L)$ representing a range of values (where L is an integer greater than or equal to 2, $b_1, \ldots, b_L$ are real numbers that meet $b_1 < \ldots < b_L$) of a function 1/x required for definition of a secure batch mapping $map_2$.

By way of a coordinate calculation by the W secure softmax function calculation apparatuses $100_i$, the secure softmax function calculation system 10 implements secure computing of softmax functions, which is a multi-party protocol. Thus, a subtraction means 110 (not illustrated) of the secure softmax function calculation system 10 is constituted with subtraction units $110_1, \ldots, 110_W$. A first secure batch mapping calculation means 120 (not illustrated) is constituted with first secure batch mapping calculation units $120_1, \ldots, 120_W$. An addition means 130 (not illustrated) is constituted with addition units $130_1, \ldots, 130_W$. A second secure batch mapping calculation means 140 (not illustrated) is constituted with second secure batch mapping calculation units $140_1, \ldots, 140_W$.

The secure softmax function calculation system 10 calculates a share $([[softmax (u_1)]], \ldots, [[softmax (u_J)]])$ of a value $(softmax (u_1), \ldots, softmax (u_J))$ of a softmax function for an input vector $(u_1, \ldots, u_J)$ from a share $([[u_1]], \ldots, [[u_J]])$ of the input vector $(u_1, \ldots, u_J)$ (where J is an integer greater than or equal to 1). The operation of the secure softmax function calculation system 10 will be described below in accordance with FIG. 3.

At S110, the subtraction means 110 calculates a share $([[u_1-u_1]], [[u_2-u_1]], \ldots, [[u_J-u_1]], [[u_1-u_2]], \ldots, [[u_J-u_2]], \ldots, [[u_1-u_J]], \ldots, [[u_J-u_J]]$ from the share $([[u_1]], \ldots, [[u_J]])$.

At S120, the first secure batch mapping calculation means 120 calculates $map_1$ $((([[u_1-u_1]], [[u_2-u_1]], \ldots, [[u_J-u_1]], [[u_1-u_2]], \ldots, [[u_J-u_2]], \ldots, [[u_1-u_J]], \ldots, [[u_J-u_J]]))=([[\alpha_{f(1,\ 1)}]], [[\alpha_{f(2,\ 1)}]], \ldots, [[\alpha_{f(J,\ 1)}]], [[\alpha_{f(1,\ 2)}]], \ldots, [[\alpha_{f(J,\ 2)}]], \ldots, [[\alpha_{f(1,\ J)}]], \ldots, [[\alpha_{f(J,\ J)}]])$ from the share $([[u_1-u_1]], [[u_2-u_1]], \ldots, [[u_J-u_1]], [[u_1-u_2]], \ldots, [[u_J-u_2]], \ldots, [[u_1-u_J]], \ldots, [[u_J-u_J]])$ (where f(i, j) ($1 \leq i$, $j \leq K$) is p where $a_p \leq u_i - u_j < a_{p+1}$) to make $([[exp (u_1-u_1)]], [[exp (u_2-u_1)]], \ldots, [[exp (u_J-u_1)]], [[exp (u_1-u_2)]], \ldots, [[exp (u_J-u_2)]], \ldots, [[exp (u_1-u_J)]], \ldots, [[exp (u_J-u_J)]])=([[\alpha_{f(1,\ 1)}]], [[\alpha_{f(2,\ 1)}]], \ldots, [[\alpha_{f(J,\ 1)}]], [[\alpha_{f(1,\ 2)}]], \ldots, [[\alpha_{f(J,\ 2)}]], \ldots, [[\alpha_{f(1,\ J)}]], \ldots, [[\alpha_{f(J,\ J)}]])$.

At S130, the addition means 130 calculates a share $$\left(\left[\left[\sum\nolimits_{j=1}^{J} \exp(u_j - u_1)\right]\right], \left[\left[\sum\nolimits_{j=1}^{J} \exp(u_j - u_2)\right]\right],\right.$$
$$\left.\ldots, \left[\left[\sum\nolimits_{j=1}^{J} \exp(u_j - u_J)\right]\right]\right)$$

from the share $([[exp (u_1-u_1)]], [[exp (u_2-u_1)]], \ldots, [[exp (u_J-u_1)]], [[exp (u_1-u_2)]], \ldots, [[exp (u_J-u_2)]], \ldots, [[exp (u_1-u_J)]], \ldots, [[exp (u_J-u_J)]])$.

At S140, the second secure batch mapping calculation means 140 calculates $map_2$ $$\left(\left(\left[\left[\sum\nolimits_{j=1}^{J} \exp(u_j - u_1)\right]\right], \left[\left[\sum\nolimits_{j=1}^{J} \exp(u_j - u_2)\right]\right],\right.\right.$$
$$\left.\left.\ldots, \left[\left[\sum\nolimits_{j=1}^{J} \exp(u_j - u_J)\right]\right]\right)\right) = ([[\beta_{g(1)}]], [[\beta_{g(2)}]], \ldots, [[\beta_{g(J)}]])$$

from the share $$\left(\left[\left[\sum\nolimits_{j=1}^{J} \exp(u_j - u_1)\right]\right], \left[\left[\sum\nolimits_{j=1}^{J} \exp(u_j - u_2)\right]\right],\right.$$
$$\left.\ldots, \left[\left[\sum\nolimits_{j=1}^{J} \exp(u_j - u_J)\right]\right]\right)$$

(where g(i) (1≤i≤L) is p where $$b_p \le \sum_{j=1}^{J} \exp(u_j - u_i) < b_{p+1}$$

to make ([[softmax (u₁)]], [[softmax (u₂)]], . . . , [[softmax (u_J)]])=([[β_{g(1)}]], [[β_{g(2)}]], . . . , [[β_{g(J)}]]).
(Setting Example of Domain of Definition and Range of Values of Secure Batch Mapping) As described in Technical Background, in the case of secure computing using fixed point arithmetic, the parameters $\alpha_1$ and $\alpha_K$ representing the range of values of the secure batch mapping map₁ can be taken as $\alpha_1=0$ and $\alpha_K=2^{b-y}$, respectively (where $b_y$ represents the number of bits in the fractional portion of the fixed point representing the accuracy of the output of the softmax function).

By setting in this way, recording wasteful ranges of values that are not used for the secure computing can be prevented, and search in lookup tables in the calculation of the secure batch mapping also gets faster.

According to the embodiment of the present invention, it is possible to perform secure computing of softmax functions at high speed and with high accuracy. Here, the domain of definition and the range of values of the secure batch mapping map₁ and map₂ can be arbitrarily set, and thus can be determined according to the required accuracy and processing speed. In the embodiment of the present invention, unlike conventional methods in which approximation is made to exponential functions, any precision can be set, so secure computing of softmax functions with accuracy that is comparable to plaintext is possible.

Second Embodiment

Figure 6:
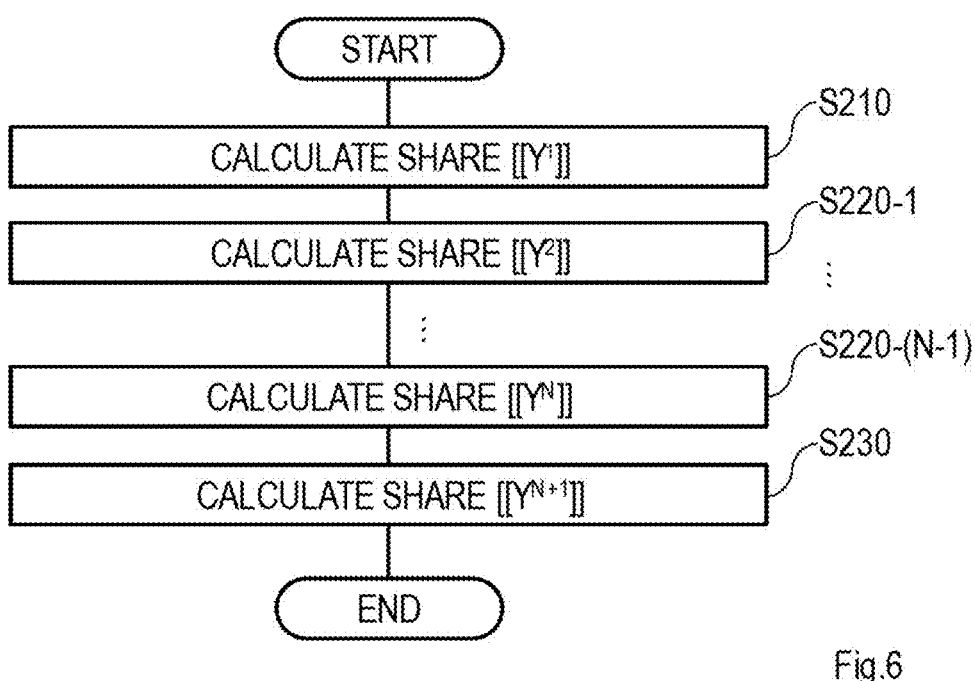
FIG. 6 is a flowchart illustrating an operation of the secure neural network calculation system 20.

A secure neural network calculation system 20 will be described below with reference to FIGS. 4 to 6. FIG. 4 is a block diagram illustrating a configuration of the secure neural network calculation system 20. The secure neural network calculation system 20 includes W' (W' is a predetermined integer greater than or equal to 3) secure neural network calculation apparatuses 200₁, . . . , 200_W'. The secure neural network calculation apparatuses 200₁, . . . , 200_W' are connected to a network 800 and are capable of communicating with each other. The network 800 may be, for example, a communication network such as the Internet or a broadcast communication path. FIG. 5 is a block diagram illustrating a configuration of the secure neural network calculation apparatus 200_i (1≤i≤W'). FIG. 6 is a flowchart illustrating an operation of the secure neural network calculation system 20.

As illustrated in FIG. 5, the secure neural network calculation apparatus 200_i includes an input layer calculation unit 210_i, an n-th layer calculation unit 220-n_i (n=1, . . . , N−1, N is an integer greater than or equal to 2, and N−1 represents the number of hidden layers (intermediate layers)), an output layer calculation unit 230_i, and a recording unit 190_i. Each of the components of the secure neural network calculation apparatus 200_i excluding the recording unit 190_i is configured such that operations required for the secure computing, specifically, operations required to implement functions of each of the components among at least concealment, addition, multiplication, secure batch mapping, and right shift, can be executed. Specific functional configurations for implementing individual operations in the present invention are sufficient to be configurations such that the algorithms disclosed in, for example, each of the reference NPL 1 to 6 can be executed, and these are conventional configurations, so the detailed description thereof will be omitted. The recording unit 190_i is a component that records information required for processing executed by the secure neural network calculation apparatus 200_i.

By way of a coordinate calculation by the W' secure neural network calculation apparatuses 200_i, the secure neural network calculation system 20 implements secure computing by the neural network, which is a multi-party protocol. Thus, an input layer calculation means 210 (not illustrated) of the secure neural network calculation system 20 is constituted with input layer calculation units 210₁, . . . , 210_W'. An n-th layer calculation means 220-n (n=1, . . . , N−1) (not illustrated) is constituted with n-th layer calculation units 220-n₁, . . . , 220-n_W'. An output layer calculation means 230 (not illustrated) is constituted with output layer calculation units 230₁, . . . , 230_W'.

The secure neural network calculation system 20 calculates a share $[[Y^{N+1}]]$ of an output value $Y^{N+1}$ (N is an integer greater than or equal to 2) for input data X from a share $[[X]]$ of the input data X. The operation of the secure neural network calculation system 20 will be described below in accordance with FIG. 6. Here, the input data X, an output value $Y^1$ of an input layer, an output value $Y^{n+1}$ of an n-th layer (n=1, . . . , N−1), and an output value $Y^{N+1}$ of an output layer are represented by vectors, and a parameter $W^0$ of the input layer, a parameter $W^n$ (n=1, . . . , N−1) of the n-th layer, and a parameter $W^N$ of the output layer are represented by matrices. Note that a share $[[W^0]]$ of the parameter $W^0$ of the input layer, a share $[[W^n]]$ of the parameter $W^n$ of the n-th layer (n=1, . . . , N−1), and a share $[[W^N]]$ of the parameter $W^N$ of the output layer may be recorded in advance in the recording unit 190_i (1≤i≤W'), for example.

At S210, the input layer calculation means 210 calculates a share $[[Y^1]]$ of an output value $Y^1$ of an input layer from a share $[[X]]$ by using a share $[[W^0]]$ of a parameter $W^0$ of an input layer. The input layer calculation means 210 calculates the share $[[Y^1]]$, for example, according to the following equation.

[Math. 4]

$$[[U^1]] \leftarrow [[W^0]][[X]] \tag{a-1}$$

$$[[Y^1]] \leftarrow \text{Activation}([[U^1]]) \tag{a-2}$$

Here, Activation represents an activation function. It is assumed that both the activation function Activation and its derivative Activation' are both functions capable of secure computing. As the activation function, for example, a function ReLU (x) can be used. In this case, a derivative ReLU'(x) is given, for example, by the following equation.

[Math. 5]

$$ReLU'(x) = \begin{cases} 0 & (x \le 0) \\ 1 & (x > 0) \end{cases}$$

Note that $U^1$ is referred to as an intermediate output value of the input layer.

With n=1, . . . , N−1, at S220-n, the n-th layer calculation means 220-n calculates the share $[[Y^{n+1}]]$ of the output value $Y^{n+1}$ of the n-th layer from the share $[[Y^n]]$ by using the share $[[W^n]]$ of the parameter $W^n$ of the n-th layer. The n-th layer calculation means 220-$n$ calculates the share $[[Y^{n+1}]]$, for example, according to the following equation.

[Math. 6]

$$[[U^{n+1}]] \leftarrow [[W^n]][[Y^n]] \qquad (b\text{-}1)$$

$$[[Y^{n+1}]] \leftarrow \text{Activation}([[U^{n+1}]]) \qquad (b\text{-}2)$$

Note that $U^{n+1}$ is referred to as an intermediate output value of the n-th layer.

At S230, the output layer calculation means 230 calculates the share $[[Y^{N+1}]]$ of the output value $Y^{N+1}$ of the output layer from the share $[[Y^N]]$ by using the share $[[W^N]]$ of the parameter $W^N$ of the output layer. The output layer calculation means 230 calculates the share $[[Y^{N+1}]]$, for example, according to the following equation.

[Math. 7]

$$[[U^{N+1}]] \leftarrow [[W^N]][[Y^N]] \qquad (c\text{-}1)$$

$$\lfloor\lfloor Y^{N+1} \rfloor\rfloor \leftarrow \text{softmax}(\lfloor\lfloor U^{N+1} \rfloor\rfloor) \qquad (c\text{-}2)$$

Note that $U^{N+1}$ is referred to as an intermediate output value of the output layer.

Figure 7:
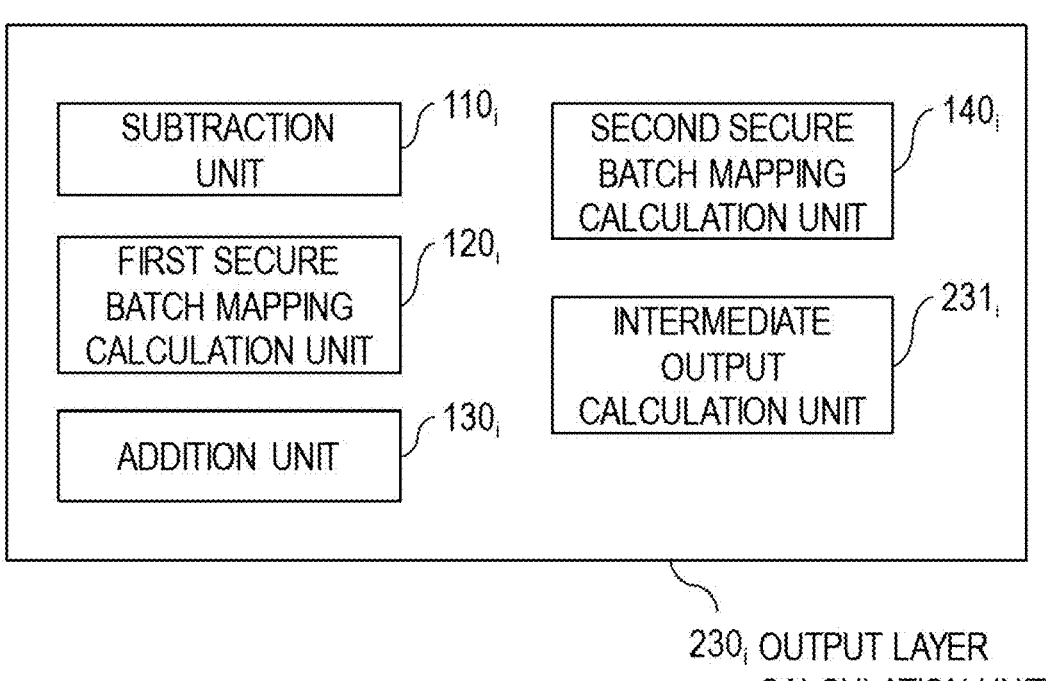
FIG. 7 is a block diagram illustrating a configuration of an output layer calculation unit 230$_i$.
Figure 8:
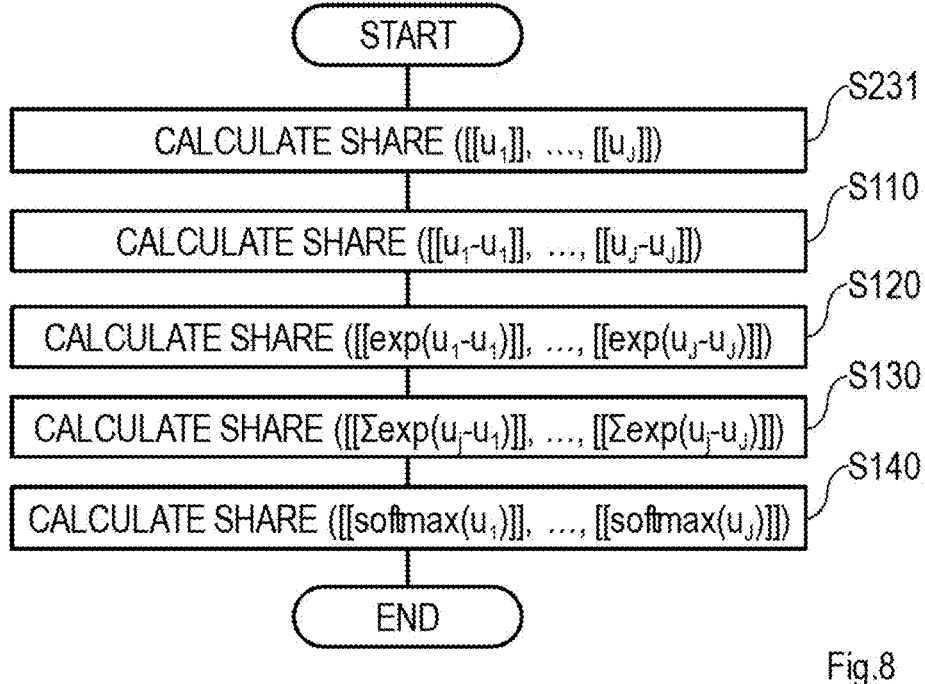
FIG. 8 is a flowchart illustrating an operation of an output layer calculation means 230.

The output layer calculation means 230 will be described below with reference to FIGS. 7 to 8. FIG. 7 is a block diagram illustrating a configuration of the output layer calculation unit 230$_i$. FIG. 8 is a flowchart illustrating an operation of the output layer calculation means 230. A subtraction means 110 (not illustrated) of the output layer calculation means 230 is constituted with subtraction units 110$_1$, . . . , 110$_{W''}$. A first secure batch mapping calculation means 120 (not illustrated) is constituted with first secure batch mapping calculation units 120$_1$, . . . , 120$_{W''}$. An addition means 130 (not illustrated) is constituted with addition units 130$_1$, . . . , 130$_{W''}$. A second secure batch mapping calculation means 140 (not illustrated) is constituted with second secure batch mapping calculation units 140$_1$, . . . , 140$_{W''}$. An intermediate output calculation means 231 (not illustrated) is constituted with intermediate output calculation units 231$_1$, . . . , 231$_{W''}$. As illustrated in FIG. 7, the output layer calculation unit 230$_i$ includes a subtraction unit 110$_i$, a first secure batch mapping calculation unit 120$_i$, an addition unit 130$_i$, a second secure batch mapping calculation unit 140$_i$, and an intermediate output calculation unit 231$_i$.

The operation of the output layer calculation means 230 will be described in accordance with FIG. 8.

At S231, the intermediate output calculation means 231 calculates the share $[[U^{N+1}]]$ of the intermediate output value $U^{N+1}$ of the output layer from the share $[[Y^N]]$ by using the share $[[W^N]]$ of the parameter $W^N$ of the output layer. The intermediate output calculation means 231 calculates the share $[[U^{N+1}]]$, for example, according to Relationship (c-1).

Hereinafter, in the case of the intermediate output value $U^{N+1}=(u_1, \ldots, u_J)$ (where J is an integer greater than or equal to 1), the share $[[U^{N+1}]]=([[u_1]], \ldots, [[u_J]])$ of the intermediate output value $U^{N+1}$.

At S110, the subtraction means 110 calculates a share $[[u_1-u_1]]$, $[[u_2-u_2]]$, . . . , $[[u_J-u_1]]$, $[[u_1-u_2]]$, . . . , $[[u_J-u_2]]$, . . . , $[[u_1-u_J]]$, . . . , $[[u_J-u_J]]$) from the share $([[u_1]], \ldots, [[u_J]])$.

At S120, the first secure batch mapping calculation means 120 calculates map$_1$ $(([[u_1-u_1]], [[u_2-u_1]], \ldots, [[u_J-u_1]], [[u_1-u_2]], \ldots, [[u_J-u_2]], \ldots, [[u_1-u_J]], \ldots, [[u_J-u_J]]))=([[\alpha_{f(1,\ 1)}]], [[\alpha_{f(2,\ 1)}]], \ldots, [[\alpha_{f(J,\ 1)}]], [[\alpha_{f(1,\ 2)}]], \ldots, [[\alpha_{f(J,\ 2)}]], \ldots, [[\alpha_{f(1,\ J)}]], \ldots, [[\alpha_{f(J,\ J)}]])$ from the share $([[u_1-u_1]], [[u_2-u_1]], \ldots, [[u_J-u_1]], [[u_1-u_2]], \ldots, [[u_J-u_2]], \ldots, [[u_1-u_J]], \ldots, [[u_J-u_J]])$ (where $f(i, j)$ $(1 \le i,\ j \le K)$ is p where $a_p \le u_i - u_j < a_{p+1}$) to make $([[\exp (u_1-u_1)]], [[\exp (u_2-u_1)]], \ldots, [[\exp (u_J-u_1)]], [[\exp (u_1-u_2)]], \ldots, [[\exp (u_J-u_2)]], \ldots, [[\exp (u_1-u_J)]], \ldots, [[\exp (u_J-u_J)]])=[[\alpha_{f(1,\ 1)}]], [[\alpha_{f(2,\ 1)}]], \ldots, [[\alpha_{f(J,\ 1)}]], \ldots, [[\alpha_{f(1,\ 2)}]], \ldots, [[\alpha_{f(J,\ 2)}]], \ldots, [[\alpha_{f(1,\ J)}]], \ldots, [[\alpha_{f(J,\ J)}]])$.

At S130, the addition means 130 calculates a share $$\left(\left[\left[\sum_{j=1}^{J} \exp(u_j - u_1)\right]\right], \left[\left[\sum_{j=1}^{J} \exp(u_j - u_2)\right]\right], \\ \ldots, \left[\left[\sum_{j=1}^{J} \exp(u_j - u_J)\right]\right]\right)$$

from the share $([[\exp (u_1-u_1)]], [[\exp (u_2-u_1)]], \ldots, [[\exp (u_J-u_1)]], [[\exp (u_1-u_2)]], \ldots, [[\exp (u_J-u_2)]], \ldots, [[\exp (u_1-u_J)]], \ldots, [[\exp (u_J-u_J)]])$.

At S140, the second secure batch mapping calculation means 140 calculates map$_2$ $$\left(\left(\left[\left[\sum_{j=1}^{J} \exp(u_j - u_1)\right]\right], \left[\left[\sum_{j=1}^{J} \exp(u_j - u_2)\right]\right], \\ \ldots, \left[\left[\sum_{j=1}^{J} \exp(u_j - u_J)\right]\right]\right)\right) = ([[\beta_{g(1)}]], [[\beta_{g(2)}]], \ldots, [[\beta_{g(J)}]])$$

from the share $$\left(\left[\left[\sum_{j=1}^{J} \exp(u_j - u_1)\right]\right], \left[\left[\sum_{j=1}^{J} \exp(u_j - u_2)\right]\right], \\ \ldots, \left[\left[\sum_{j=1}^{J} \exp(u_j - u_J)\right]\right]\right)$$

(where $g(i)$ $(1 \le i \le L)$ is p where $$b_p \le \sum_{j=1}^{J} \exp(u_j - u_i) < b_{p+1}$$

to make$[[Y^{N+1}]]=([[\text{softmax} (u_1)]], [[\text{softmax} (u_2)]], \ldots, [[\text{softmax} (u_J)]])=([[\beta_{g(1)}]], [[\beta_{g(2)}]], \ldots, [[\beta_{g(J)}]])$.

According to the embodiment of the present invention, it is possible to perform secure computing by the neural network at high speed and with high accuracy. By using the first embodiment, softmax functions can be calculated with high accuracy, so the secure computing by the neural network can be performed with high accuracy compared to the conventional techniques of NPL 1 or NPL 2.

(Modification)

For secure computing, the processing costs of floating point numbers are large. Thus, here, consider a case of performing calculation in each of the components using fixed point numbers.

First, the accuracy required for each variable or constant is set. For example, in a case where the accuracy is $\alpha$ bits ($\alpha$ is the number of bits in the decimal point portion), secret sharing is performed for the share $[[x]]$ as a fixed point number $[[x \times 2^\alpha]]$ with a base number of two. Note that the reasons why the accuracies of all variables and constants are not the same is because the range of values is different for each variable or constant, and the required accuracies are different from each other. For example, a variable representing a parameter is preferably set to higher accuracy than other variables because a parameter tends to be small. In a case where the accuracy required for the variable x representing the input data X, the variable y representing the output value $Y^{N+1}$ of the output layer, and the variable w representing the parameter $W^0$ of the input layer, the parameter $W^n$ (n=1, . . . , N–1) of the n-th layer, and the parameter $W^N$ of the output layer are $b_x$, $b_y$, and $b_w$, respectively, $b_x$=8, $b_y$=14, $b_w$=20, or the like. In this way, by setting the accuracy required for each variable and constant, it is possible to efficiently calculate secure computing with large processing costs while reducing the overall number of bits as much as possible.

In a case where the processing is performed with fixed point numbers, there is a problem that the accuracy changes in performing multiplication. For example, multiplying $[[x_1 \times 2^\alpha]]$ by $[[x_2 \times 2^\alpha]]$ results in $[[x_1 x_2 \times 2^{2\alpha}]]$, resulting in a bits greater than the original value. In the calculation of the neural network, multiplication is performed for each of the layers, and thus, in a case of normally processing as is, it will cause overflow in the middle of the process. Thus, here, by using the right shift rshift, the calculation in the neural network is efficiently implemented with fixed point numbers while intentionally dropping digits and preventing overflow.

Detailed description will be given below. The operation of the secure neural network calculation system 20, which has devised to prevent overflow by multiplication, will be described (see FIG. 6), assuming that required accuracies for the variable x, the variable y, and the variable w being $b_x$, $b_y$, and $b_w$, respectively.

At S210, the input layer calculation means 210 calculates the share $[[Y^1]]$ according to Relationship (a-1) and Relationship (a-2).

With n=1, . . . , N–1, at S220-n, the n-th layer calculation means 220-n calculates the share $[[Y^{n+1}]]$ according to the following equation.

[Math. 8]

$$[[U^{n+1}]] \leftarrow [[W^n]][[Y^n]] \quad \text{(b-1)}$$

$$[[Y^{n+1}]] \leftarrow \text{Activation}([[U^{n+1}]]) \quad \text{(b-2)}$$

$$[[Y^{n+1}]] \leftarrow \text{rshift}([[Y^{n+1}]], b_w) \quad \text{(b-3)}$$

At S230, the output layer calculation means 230 calculates the share $[[Y^{N+1}]]$ according to Relationship (c-1) and Relationship (c-2).

Here, the processing features of S210 to S230 described above will be described. In general, because the right shift in the secure computing is a large cost processing, the number of right shifts may be reduced as much as possible. Thus, the processing from S210 to S230 is to perform the minimum required right shift calculation (calculation of Relationship (b-3)). Because the secure batch mapping has the property of being able to arbitrarily set the domain of definition and the range of values, it is possible to adjust the number of digits as in the right shift by using the secure batch mapping. Thus, by including the effect of the right shift in the calculation of the secure batch mapping in the calculation of Relationship (c-2), it is possible to process the accuracy adjustment from 2 $b_w$+$b_x$ to $b_y$ in the calculation of Relationship (c-2).

The processing of S210 to S230 described above will be described below in terms of accuracy. In the calculation of Equation (a-1) and the calculation of Relationship (a-2) of the input layer calculation means 210 at S210, the accuracy is $b_w$+$b_x$, and $b_w$+$b_x$, respectively. In the calculation of Relationship (b-1) and the calculation of Relationship (b-2) of the first layer calculation means 220-1 at S220-1, the accuracy is $2b_w$+$b_x$, and $2b_w$+$b_x$, respectively. Thus, in a case where the calculation of Relationship (b-1) and the calculation of Relationship (b-2) of the second layer calculation means 220-2 at S220-2 are performed as is, the accuracy is $3b_w$+$b_x$, and $3b_w$+$b_x$, respectively. In a case where this is repeated, the digits increase by $b_w$ each time the calculation in the intermediate layer proceeds. Thus, the n-th layer calculation means 220-n re-calculates the share $[[Y^{n+1}]]$ according to Relationship (b-3). In this way, it is possible to solve the problem that the digits increase by $b_w$ each time the calculation in the layer proceeds. Thus, the accuracy at the time that the calculation of Relationship (b-3) of the (N–1) layer calculation means 220-(N–1) has finished is $b_w$+$b_x$. Then, in the calculation of Relationship (c-1) and the calculation of Relationship (c-2) of the output layer calculation means 230 at S230, the accuracy is $2b_w$+$b_x$, and $b_y$, respectively.

Third Embodiment

Figure 9:
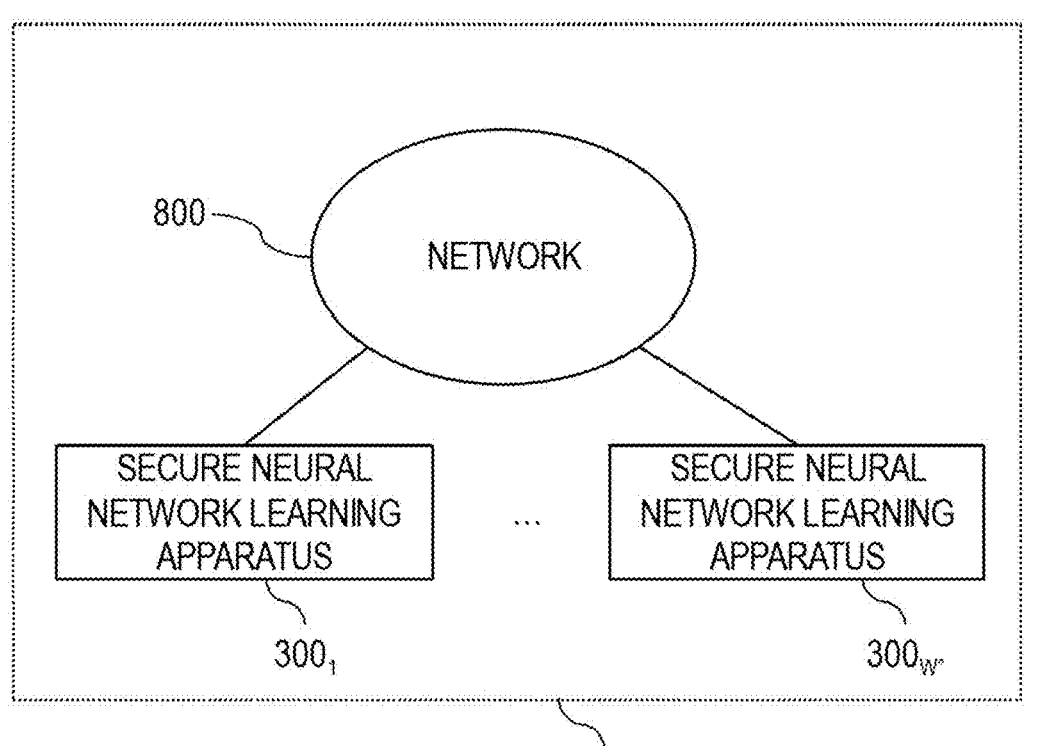
FIG. 9 is a block diagram illustrating a configuration of a secure neural network learning system 30.
Figure 10:
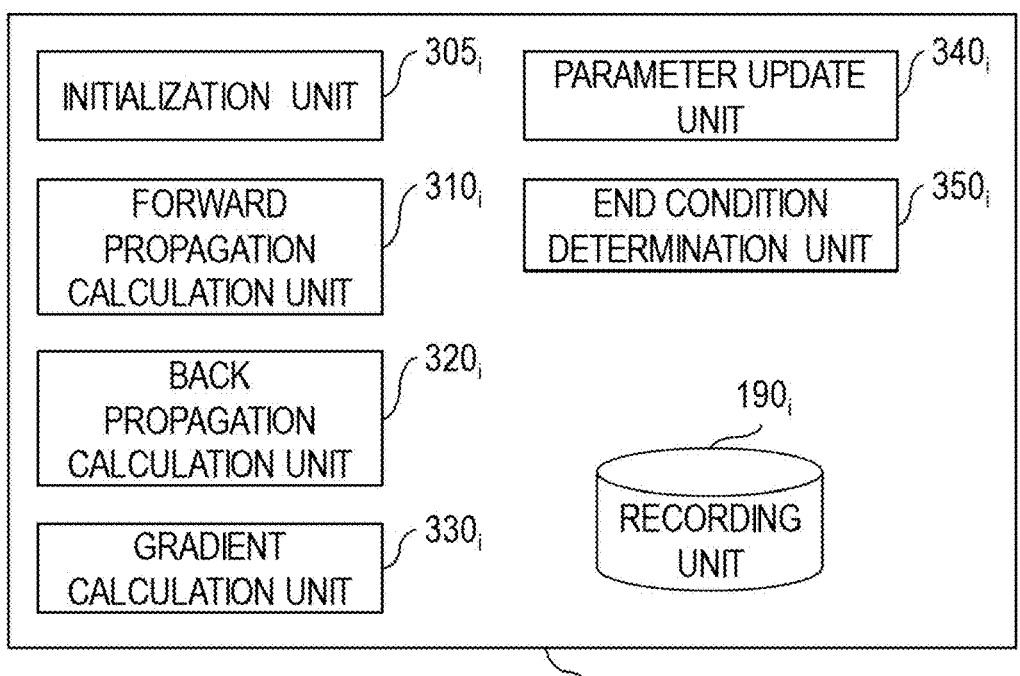
FIG. 10 is a block diagram illustrating a configuration of a secure neural network learning apparatus 300$_i$.

A secure neural network learning system 30 will be described below with reference to FIGS. 9 to 11. FIG. 9 is a block diagram illustrating a configuration of the secure neural network learning system 30. The secure neural network learning system 30 includes W" (W" is a predetermined integer greater than or equal to 3) secure neural network learning apparatuses $300_1$, . . . , $300_{W''}$. The secure neural network learning apparatuses $300_1$, . . . , $300_{W''}$ are connected to a network 800 and are capable of communicating with each other. The network 800 may be, for example, a communication network such as the Internet or a broadcast communication path. FIG. 10 is a block diagram illustrating a configuration of the secure neural network learning apparatus $300_i$ (1≤i≤W"). FIG. 11 is a flowchart illustrating an operation of the secure neural network learning system 30.

As illustrated in FIG. 11, the secure neural network learning apparatus $300_i$ includes an initialization unit $305_i$, a forward propagation calculation unit $310_i$, a back propagation calculation unit $320_i$, a gradient calculation unit $330_i$, a parameter update unit $340_i$, an end condition determination unit $350_i$, and a recording unit $190_i$. Each of the components of the secure neural network learning apparatus 300 excluding the recording unit $190_i$ is configured such that operations required for the secure computing, specifically, operations required to implement functions of each of the components among at least concealment, addition, multiplication, secure batch mapping, and right shift, can be executed. Specific functional configurations for implementing individual operations in the present invention are sufficient to be configurations such that the algorithms disclosed in, for example, each of the reference NPL 1 to 6 can be executed, and these are conventional configurations, so the detailed description thereof will be omitted. The recording unit $190_i$ is a component that records information required for processing executed by the secure neural network learning apparatus $300_i$.

By way of a coordinate calculation by the W" secure neural network learning apparatuses $300_i$, the secure neural network learning system 30 implements secure computing for learning of a neural network, which is a multi-party protocol. Thus, an initialization means 305 (not illustrated) of the secure neural network learning system 30 is constituted with initialization units $305_1$, . . . , $305_{W''}$. A forward propagation calculation means 310 (not illustrated) is constituted with forward propagation calculation units $310_1$, . . . , $310_{W''}$. A back propagation calculation means 320 (not illustrated) is constituted with back propagation calculation units $320_1, \ldots, 320_{W'''}$. A gradient calculation means 330 (not illustrated) is constituted with gradient calculation units $330_1, \ldots, 330_{W'''}$. A parameter update means 340 (not illustrated) is constituted with parameter update units $340_1, \ldots, 340_{W'''}$. An end condition determination means 350 (not illustrated) is constituted with end condition determination units $350_1, \ldots, 350_{W'''}$.

The secure neural network learning system 30 updates a share $[[W^0]]$ of a parameter $W^0$ of an input layer, a share $[[W'']]$ of a parameter $W''$ of an n-th layer $[[W'']]$ (n=1, . . . , N−1, N is an integer greater than or equal to 2), and a share $[[W^N]]$ of a parameter $W^N$ of an output layer by using a share $[[X]]$ of learning data X and a share $[[T]]$ of a learning label T. The operation of the secure neural network learning system 30 will be described below in accordance with FIG. 11. Here, the learning data X, the learning label T, an output value $Y^1$ of the input layer, an output value $Y^{n+1}$ of the n-th layer (n=1, . . . , N−1), and an output value $Y^{N+1}$ of the output layer are represented by vectors, and the parameter $W^0$ of the input layer, the parameter $W''$ (n=1, . . . , N−1) of the n-th layer, and the parameter $W^N$ of the output layer are represented by matrices. Note that the share $[[W^0]]$ of the parameter $W^0$ of the input layer, the share $[[W'']]$ of the parameter $W''$ of the n-th layer (n=1, . . . , N−1), and the share $[[W^N]]$ of the parameter $W^N$ of the output layer in learning may be recorded in the recording unit 190, for example. Note that the operation of the secure neural network learning system 30 described here corresponds to a learning method of a neural network using a gradient descent method and a back propagation.

At S305, the initialization means 305 sets initial values of the share $[[W^0]]$ of the parameter $W^0$ of the input layer, the share $[[W'']]$ of the parameter $W''$ of the n-th layer (n=1, . . . , N−1), and the share $[[W^N]]$ of the parameter $W^N$ of the output layer. The initialization means 305 appropriately set the value required for the determination of the end of learning. For example, in a case where the number of learning times is used for the determination of the end of learning, the initialization means 305 sets an initial value of a counter t representing the number of learning times (specifically, t=0) and a threshold value T representing the number of repetitive learning times. In a case where a criterion of whether or not the amount of change of the parameter has become sufficiently small is used instead of using the number of learning times for the determination of the end of learning, the initialization means 305 sets a threshold value c representing the degree of convergence.

Figure 13:
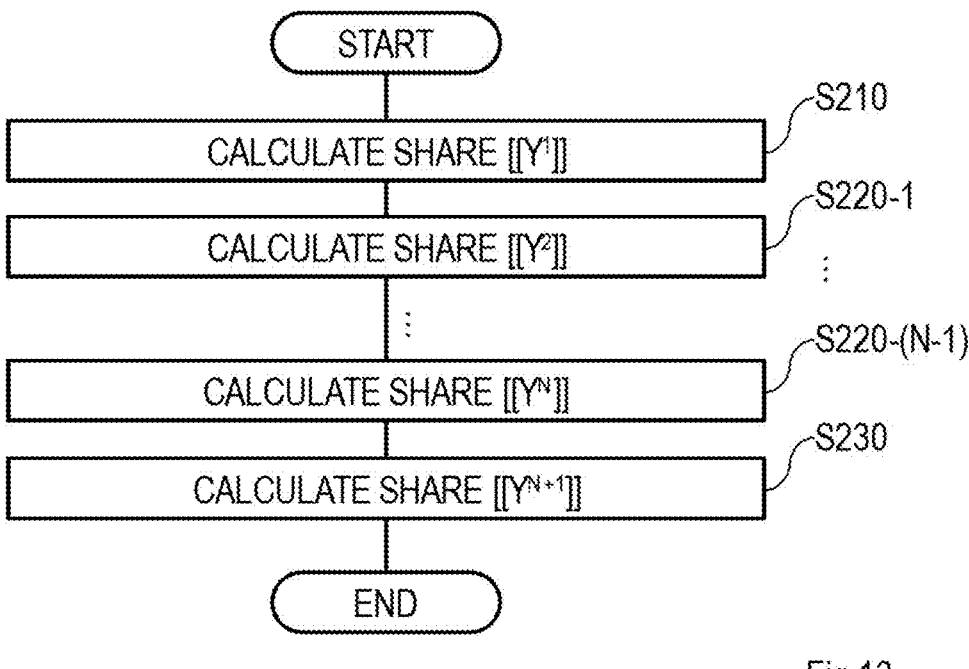
FIG. 13 is a flowchart illustrating an operation of a forward propagation calculation means 310.

At S310, the forward propagation calculation means 310 calculates a share $[[Y^1]]$ of an output value $Y^1$ of an input layer, a share $[[Y^{n+1}]]$ of an output value $Y^{n+1}$ of an n-th layer $[[Y^{n+1}]]$ (n=1, . . . , N−1), and a share $[[Y^{N+1}]]$ of an output value $Y^{N+1}$ of an output layer from the share $[[X]]$ by using the share $[[W'']]$ (n=0, . . . , N). The forward propagation calculation means 310 will be described below with reference to FIGS. 12 and 13. FIG. 12 is a block diagram illustrating a configuration of the forward propagation calculation unit $310_i$. FIG. 13 is a flowchart illustrating an operation of the forward propagation calculation unit 310. An input layer calculation means 210 (not illustrated) of the forward propagation calculation means 310 is constituted with input layer calculation units $210_1, \ldots, 210_{W'''}$, an n-th layer calculation means 220-n (n=1, . . . , N−1) (not illustrated) is constituted with n-th layer calculation units $220\text{-}n_1, \ldots, 220\text{-}n_{W'''}$, and an output layer calculation means 230 (not illustrated) is constituted with output layer calculation units $230_1, \ldots, 230_{W'''}$. As illustrated in FIG. 12, the forward propagation calculation unit $310_i$ includes an input layer calculation unit $210_i$, an n-th layer calculation unit $220\text{-}n_i$ (n=1, . . . , N−1, N is an integer greater than or equal to 2, and N−1 represents the number of hidden layers (intermediate layers)), and an output layer calculation unit $230_i$.

The operation of the forward propagation calculation means 310 will be described in accordance with FIG. 13.

At S210, the input layer calculation means 210 calculates the share $[[Y^1]]$ of the output value $Y^1$ of the input layer from the share $[[X]]$ by using the share $[[W^0]]$ of the parameter $W^0$ of the input layer.

With n=1, . . . , N−1, at S220-n, the n-th layer calculation means 220-n calculates the share $[[Y^{n+1}]]$ of the output value $Y^{n+1}$ of the n-th layer from the share $[[Y'']]$ by using the share $[[W'']]$ of the parameter $W''$ of the n-th layer.

At S230, the output layer calculation means 230 calculates the share $[[Y^{N+1}]]$ of the output value $Y^{N+1}$ of the output layer from the share $[[Y^N]]$ by using the share $[[W^N]]$ of the parameter $W^N$ of the output layer. Note that the processing in the output layer calculation means 230 is the same as that described in Second Embodiment using FIGS. 7 and 8.

At S320, the back propagation calculation means 320 calculates a share $[[Z^{N+1}]]$ of an error $Z^{N+1}$ in an output layer, a share $[[Z^{n+1}]]$ of an error $Z^{n+1}$ in an n-th layer (n=N−1, . . . , 1), and a share $[[Z^1]]$ of an error $Z^1$ in an input layer from the share $[[Y^{N+1}]]$ and the share $[[T]]$ by using the share $[[W'']]$ (n=N, . . . , 1). The back propagation calculation means 320 calculates the share $[[Z^{N+1}]]$, for example, according to the following equation.

[Math. 9]

$$[[Z^{N+1}]] \leftarrow [[Y^{N+1}]] - [[T]] \tag{p-1}$$

The back propagation calculation means 320 calculates the share $[[Z^N]]$, for example, according to the following equation.

[Math. 10]

$$[[Z^N]] \leftarrow \text{Activation}'([[U^N]]) \circ ([[Z^{N+1}]][[W^N]]) \tag{p-2}$$

The back propagation calculation means 320 calculates the share $[[Z'']]$ (n=N−1, . . . , 1), for example, according to the following equation.

[Math. 11]

$$[[Z'']] \leftarrow \text{Activation}'([[U'']]) \circ ([[Z^{n+1}]][[W'']]) \tag{p-3}$$

At S330, the gradient calculation means 330 calculates a share $[[G^0]]$ of a gradient $G^0$ in the input layer, a share $[[G'']]$ of the gradient $G''$ in the n-th layer (n=1, . . . , N−1), and a share $[[G^N]]$ of a gradient $G^N$ in the output layer from the share $[[Z'']]$ (n=1, . . . , N+1) by using the share $[[X]]$ and the share $[[Y'']]$ (n=1, . . . , N). The gradient calculation means 330 calculates the share $[[G^0]]$, for example, according to the following equation.

[Math. 12]

$$[[G^0]] \leftarrow [[Z^1]][[X]] \tag{q-1}$$

The gradient calculation means 330 calculates the share $[[G'']]$ (n=1, . . . , N), for example, according to the following equation.

[Math. 13]

$$[[G'']] \leftarrow [[Z^{n+1}]][[Y'']] \tag{q-2}$$

At S340, the parameter update means 340 updates the share $[[W'']]$ (n=0, . . . , N) by using the share $[[G'']]$ ($n=0, \ldots, N$). The parameter update means 340 updates the share $[[W^0]]$, for example, according to the following equation.

[Math. 14]

$$\lceil\lceil G^0\rceil\rceil\leftarrow\text{rshift}(\lceil\lceil G^0\rceil\rceil,H) \qquad (\text{r-1})$$

$$[[W^0]]\leftarrow[[W^0]]-[[G^0]] \qquad (\text{r-2})$$

The parameter update means 340 updates the share $[[W^n]]$ ($n=1, \ldots, N-1$), for example, according to the following equation.

[Math. 15]

$$\lfloor\lfloor G^n\rfloor\rfloor\leftarrow\text{rshift}(\lfloor\lfloor G^n\rfloor\rfloor,H) \qquad (\text{r-3})$$

$$[[W^n]]\leftarrow[[W^n]]-[[G^n]] \qquad (\text{r-4})$$

The parameter update means 340 updates the share $[[W^N]]$, for example, according to the following equation.

[Math. 16]

$$[[G^N]]\leftarrow\text{rshift}([[G^N]],H) \qquad (\text{r-5})$$

$$\lfloor\lfloor W^N\rfloor\rfloor\leftarrow\lfloor\lfloor W^N\rfloor\rfloor-\lfloor\lfloor G^N\rfloor\rfloor \qquad (\text{r-6})$$

Here H is a value defined by the following equation.

[Math. 17]

$$H = -\left\lfloor\log_2\frac{\eta}{m}\right\rfloor \qquad (2)$$

Here, $\eta$ represents the learning rate, and m represents the batch size.

In order to efficiently calculate the multiplication of the learning rate $\eta$ with the ratio $\eta/m$ of the batch size m, the ratio $\eta/m$ is approximated with a number $2^{-H}$ of a power of 2 by Equation (2). Thus, the learning rate $\eta$ and the batch size m may both be set to a value of a power of 2.

This H is used to calculate the update of the share $[[W^n]]$ ($n=0, N$), i.e., to perform rshift by H bits in Relationship (r-1), Relationship (r-3), and Relationship (r-5).

At S350, in a case where the end condition is satisfied, the end condition determination means 350 outputs the share $[[W^n]]$ ($n=0, \ldots, N$) at the time, and terminates the process. Otherwise, the secure neural network learning system 30 returns to the processing of S310. That is, the secure neural network learning system 30 repeats the processing from S310 to S350. Note that the case where the end condition is satisfied is the case where the counter t reaches the threshold value T in the case where the number of learning times is used for the determination of the end of learning. Similarly, the case where the end condition is satisfied is the case where the amount of change of the parameter is smaller than c in the case where a criterion of whether or not the amount of change of the parameter has become sufficiently small is used. In the case where the number of learning times is used for the determination of the end of learning, the end condition determination means 350 increments the value of the counter t by one.

Although the calculation in the forward propagation calculation means 310 needs to be calculated in the order of the input layer, the hidden layer, and the output layer and the calculation in the back propagation calculation means 320 needs to be calculated in the order of the output layer, the hidden layer, and the input layer, the calculation in the gradient calculation means 330 and the calculation in the parameter update means 340 can be processed in parallel for each layer, and the efficiency of the processing can be increased by processing together.

According to the embodiment of the present invention, it is possible to perform secure computing for the learning of the neural network at high speed and with high accuracy. By using the first embodiment, softmax functions can be calculated with high accuracy, so the secure computing for the learning of the neural network can be performed with high accuracy compared to the conventional techniques of NPL 1 or NPL 2.

Modification

Similar to the modification of the second embodiment, by setting the required accuracy for each variable or constant, and appropriately performing the operation of the right shift rshift, secure computing for the learning of the neural network can be efficiently implemented with fixed point numbers while intentionally dropping digits and preventing overflow. The operation of the secure neural network learning system 30, which has devised to prevent overflow by multiplication, will be described, as the accuracy required for the variable x representing the learning data X, the variable y representing the output value $Y^{N+1}$ of the output layer and the learning label T, and the variable w representing the parameter $W^0$ of the input layer, the parameter $W^n$ ($n=1, \ldots, N-1$) of the n-th layer, and the parameter $W^N$ of the output layer being $b_x$, $b_y$, and $b_w$, respectively. Specifically, the operations of S310 to S340 in FIG. 11 will be described.

At S310, the forward propagation calculation means 310 performs the processing of S210 to S230 described in the modification of the second embodiment.

At S320, the back propagation calculation means 320 calculates the share $[[Z^{N+1}]]$ with Relationship (p-1). The back propagation calculation means 320 calculates the share $[[Z^N]]$, for example, according to the following equation.

[Math. 18]

$$[[Z^N]]\leftarrow\text{Activation}'([[U^N]])\circ([[Z^{N+1}]][[W^N]]) \qquad (\text{p-2})$$

$$[[Z^N]]\leftarrow\text{rshift}([[Z^N]],b_y) \qquad (\text{p-4})$$

The back propagation calculation means 320 calculates the share $[[Z^N]]$ ($n=N-1, \ldots, 1$), for example, according to the following equation.

[Math. 19]

$$[[Z^N]]\leftarrow\text{Activation}'([[U^n]])\circ([[Z^{n+1}]][[W^n]]) \qquad (\text{p-3})$$

$$[[Z^n]]\leftarrow\text{rshift}([[Z^n]],b_w) \qquad (\text{p-5})$$

At S330, the gradient calculation means 330 calculates the share $[[G^0]]$ with Relationship (q-1). The gradient calculation means 330 calculates the share $[[G^n]]$ ($n=1, \ldots, N$) according to Relationship (q-2).

At S340, the parameter update means 340 calculates the share $[[W^0]]$, for example, according to the following equation.

[Math. 20]

$$[[G^0]]\leftarrow\text{rshift}([[G^0]],b_x+H) \qquad (\text{r-1})'$$

$$[[W^0]]\leftarrow[[W^0]]-[[G^0]] \qquad (\text{r-2})'$$

The parameter update means 340 calculates the share [[$W''$]] ($n=1, \ldots, N-1$), for example, according to the following equation.

[Math. 21]

$$[[G'']] \leftarrow \text{rshift}([[G'']], b_w + b_x + H) \tag{r-3}'$$

$$[[W'']] \leftarrow [[W'']] - [[G'']] \tag{r-4}$$

The parameter update means 340 calculates the share [[$W^N$]], for example, according to the following equation.

[Math. 22]

$$[[G^N]] \leftarrow \text{rshift}([[G^N]], b_x + b_y + H) \tag{r-5}'$$

$$[[W^N]] \leftarrow [[W^N]] - [[G^N]] \tag{r-6}$$

Here, in the calculation of the right shift in the parameter update means 340 (specifically, calculation of Relationship (r-1)', Relationship (r-3)', and Relationship (r-5)', by performing approximation of division with the learning rate and the batch size by the right shift by H bits, and further performing the right shift for the accuracy adjustment at the same time, the operating costs of the right shift is reduced.

Supplements

Figure 14:
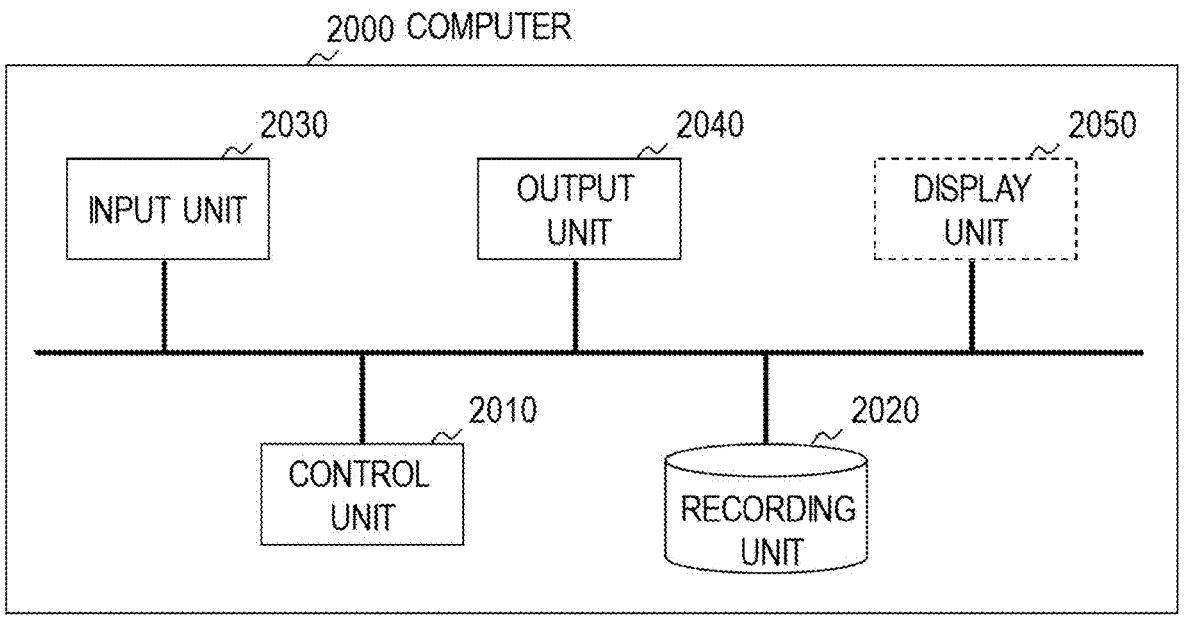
FIG. 14 is a diagram illustrating an example of a functional configuration of a computer achieving each apparatus according to the embodiments of the present invention.

FIG. 14 is a diagram illustrating an example of a functional configuration of a computer implementing each apparatus described above. The processing in each of the above-described apparatuses can be performed by causing a recording unit 2020 to read a program for causing a computer to function as each of the above-described apparatuses, and operating the program in a control unit 2010, an input unit 2030, an output unit 2040, and the like.

The apparatus according to the present invention includes, for example, as single hardware entities, an input unit to which a keyboard or the like can be connected, an output unit to which a liquid crystal display or the like can be connected, a communication unit to which a communication apparatus (for example, a communication cable) capable of communication with the outside of the hardware entity can be connected, a Central Processing Unit (CPU, which may include a cache memory, a register, and the like), a RAM or a ROM that is a memory, an external storage apparatus that is a hard disk, and a bus connected for data exchange with the input unit, the output unit, the communication unit, the CPU, the RAM, the ROM, and the external storage apparatuses. An apparatus (drive) capable of reading and writing from and to a recording medium such as a CD-ROM may be provided in the hardware entity as necessary. An example of a physical entity including such hardware resources is a general-purpose computer.

A program necessary to implement the above-described functions, data necessary for processing of this program, and the like are stored in the external storage apparatus of the hardware entity (the present invention is not limited to the external storage apparatus; for example, the program may be read out and stored in a ROM that is a dedicated storage apparatus). For example, data obtained by the processing of the program is appropriately stored in a RAM, the external storage apparatus, or the like.

In the hardware entity, each program and data necessary for the processing of each program stored in the external storage apparatus (or a ROM, for example) are read into a memory as necessary and appropriately interpreted, executed, or processed by a CPU. As a result, the CPU implements a predetermined function (each of components represented by xxx unit, xxx means, or the like).

The present invention is not limited to the above-described embodiment, and appropriate changes can be made without departing from the spirit of the present invention. The processing described in the embodiments are not only executed in time series in the described order, but also may be executed in parallel or individually according to a processing capability of an apparatus that executes the processing or as necessary.

As described above, when a processing function in the hardware entity (the apparatus of the present invention) described in the embodiment is implemented by a computer, processing content of a function that the hardware entity should have is described by a program. By executing this program using the computer, the processing function in the hardware entity is implemented on the computer.

The program in which the processing details are described can be recorded on a computer-readable recording medium. The computer-readable recording medium, for example, may be any type of medium such as a magnetic recording device, an optical disc, a magneto-optical recording medium, or a semiconductor memory. Specifically, for example, a hard disk apparatus, a flexible disk, a magnetic tape, or the like can be used as a magnetic recording apparatus, a DVD (Digital Versatile Disc), a DVD-RAM (Random Access Memory), a CD-ROM (Compact Disc Read Only Memory), CD-R (Recordable)/RW (ReWritable), or the like can be used as an optical disc, a MO (Magneto-Optical disc) or the like can be used as a magneto-optical recording medium, and an EEP-ROM (Electronically Erasable and Programmable-Read Only Memory) or the like can be used as a semiconductor memory.

In addition, the program is distributed, for example, by selling, transferring, or lending a portable recording medium such as a DVD or a CD-ROM with the program recorded on it. Further, the program may be stored in a storage device of a server computer and transmitted from the server computer to another computer via a network so that the program is distributed.

For example, a computer executing the program first temporarily stores the program recorded on the portable recording medium or the program transmitted from the server computer in its own storage device. When executing the processing, the computer reads the program stored in its own storage device and executes the processing in accordance with the read program. Further, as another execution mode of this program, the computer may directly read the program from the portable recording medium and execute processing in accordance with the program, or, further, may sequentially execute the processing in accordance with the received program each time the program is transferred from the server computer to the computer. In addition, another configuration to execute the processing through a so-called application service provider (ASP) service in which processing functions are implemented just by issuing an instruction to execute the program and obtaining results without transmitting the program from the server computer to the computer may be employed. Further, the program in this mode is assumed to include information which is provided for processing of a computer and is equivalent to a program (data or the like that has characteristics of regulating processing of the computer rather than being a direct instruction to the computer).

Although the hardware entity is configured by a predetermined program being executed on the computer in the present embodiment, at least a part of the processing content of the hardware entity may be implemented in hardware.

The invention claimed is:

1. A secure softmax function calculation system for calculating a share ([[softmax (u$_1$)]], . . . , [[softmax (u$_J$)]]) of a value (softmax (u$_1$), . . . , softmax (u$_J$)) of a softmax function for an input vector (u$_1$, . . . , u$_J$) from a share ([[u$_1$]], . . . , [[u$_J$]]) of the input vector (u$_1$, . . . , u$_J$) (where J is an integer greater than or equal to 2), the secure softmax function calculation system being constituted with three or more secure softmax function calculation apparatuses, map$_1$ being a secure batch mapping defined by a parameter (a$_1$, . . . , a$_K$) representing a domain of definition and a parameter ($\alpha_1$, . . . , $\alpha_K$) representing a range of values (where K is an integer greater than or equal to 2, a$_1$, . . . a$_K$ are real numbers that meet a$_1$< . . . <a$_K$) of a function exp (x), and map$_2$ being a secure batch mapping defined by a parameter (b$_1$, . . . , b$_L$) representing a domain of definition and a parameter ($\beta_1$, . . . , $\beta_L$) representing a range of values (where L is an integer greater than or equal to 2, b$_1$, . . . , b$_L$ are real numbers that meet b$_1$< . . . <b$_L$) of a function 1/x, the secure softmax function calculation system comprising:

the three or more secure softmax function calculation apparatuses which each have a subtraction circuitry, a first secure batch mapping calculation circuitry, an addition circuitry, a second secure batch mapping calculation circuitry, and wiring, cabling, or a wireless communication device for communicating between the three or more secure softmax function calculation apparatuses through a network, such that:

the subtraction circuitry is configured to calculate a share ([[u$_1$−u$_1$]], [[u$_2$−u$_1$]], . . . , [[u$_J$−u$_1$]], [[u$_1$−u$_2$]], . . . , [[u$_J$−u$_2$]], . . . , [[u$_1$−u$_J$]], . . . , [[u$_J$−u$_J$]]) from the share ([[u$_1$]], . . . , [[u$_J$]]);

the first secure batch mapping calculation circuitry is configured to calculate map$_1$ (([[u$_1$−u$_1$]], [[u$_2$−u$_1$]], . . . , [[u$_J$−u$_1$]], [[u$_1$−u$_2$]], . . . , [[u$_J$−u$_2$]], . . . , [[u$_1$−u$_J$]], . . . , [[u$_J$−u$_J$]]))=([[$\alpha_{f(1,\ 1)}$]], [[$\alpha_{f(2,\ 1)}$]], . . . , [[$\alpha_{f(J,\ 1)}$]], [[$\alpha_{f(1,\ 2)}$]], . . . , [[$\alpha_{f(J,\ 2)}$]], . . . , [[$\alpha_{f(1,\ J)}$]], . . . , [[$\alpha_{f(J,\ J)}$]]) from the share ([[u$_1$−u$_1$]], [[u$_2$−u$_1$]], . . . , [[u$_J$−u$_1$]], [[u$_1$−u$_2$]], . . . , [[u$_J$−u$_2$]], [[u$_1$−u$_J$]], . . . , [[u$_J$−u$_J$]]) (where f(i, j) (1≤i, j≤K) is p where a$_p$≤u$_i$−u$_j$<a$_{p+1}$) to make ([[exp (u$_1$−u$_1$)]], [[exp (u$_2$−u$_1$)]], . . . [[exp (u$_J$−u$_1$)]], [[exp (u$_1$−u$_2$)]], . . . , [[exp (u$_J$−u$_2$)]], . . . , [[exp (u$_1$−u$_J$)]], . . . , [[exp (u$_J$−u$_J$)]]=([[a$_{f(1,\ 1)}$]], [[$\alpha_{f(2,\ 1)}$]], . . . , [[$\alpha_{f(J,\ 1)}$]], [[$\alpha_{f(1,\ 2)}$]], . . . , [[$\alpha_{f(J,\ 2)}$]], . . . , [[$\alpha_{f(1,\ J)}$]], . . . , [[$\alpha_{f(J,\ J)}$]]);

the addition circuitry is configured to calculate a share $$\left(\left[\left[\sum\nolimits_{j=1}^{J}\exp(u_j-u_1)\right]\right],\left[\left[\sum\nolimits_{j=1}^{J}\exp(u_j-u_2)\right]\right],\right.$$
$$\left.\ldots,\left[\left[\sum\nolimits_{j=1}^{J}\exp(u_j-u_J)\right]\right]\right)$$

from the share ([[exp (u$_1$−u$_1$)]], [[exp (u$_2$−u$_1$)]], . . . , [exp (u$_J$−u$_1$)]], [[exp (u$_1$−u$_2$)]], . . . , [[exp (u$_J$−u$_2$)]], . . . , [[exp (u$_1$−u$_J$)]], . . . [[exp (u$_J$−u$_J$)]]); and the second secure batch mapping calculation circuitry is configured to calculate map$_2$ $$\left(\left(\left[\left[\sum\nolimits_{j=1}^{J}\exp(u_j-u_1)\right]\right],\left[\left[\sum\nolimits_{j=1}^{J}\exp(u_j-u_2)\right]\right],\right.\right.$$
$$\left.\left.\ldots,\left[\left[\sum\nolimits_{j=1}^{J}\exp(u_j-u_J)\right]\right]\right)=([[\beta_{g(1)}]],[[\beta_{g(2)}]],\ldots,[[\beta_{g(J)}]])\right)$$

from the share $$\left(\left[\left[\sum\nolimits_{j=1}^{J}\exp(u_j-u_1)\right]\right],\left[\left[\sum\nolimits_{j=1}^{J}\exp(u_j-u_2)\right]\right],\right.$$
$$\left.\ldots,\left[\left[\sum\nolimits_{j=1}^{J}\exp(u_j-u_J)\right]\right]\right)$$

(where g(i) (1≤i≤L) is p where $$b_p\le\sum\nolimits_{j=1}^{J}\exp(u_j-u_i)<b_{p+1}$$

to make ([[softmax (u$_1$)]], [[softmax (u$_2$)]], . . . ,) [[softmax (u$_J$)]])=([[$\beta_{g(1)}$]], [[$\beta_{g(2)}$]], . . . , [[$\beta_{g(J)}$]]), wherein the secure softmax function calculation system utilizes a coordinate calculation among the three or more secure function calculation apparatuses to secure computing of the softmax function through the network.

2. The secure softmax function calculation system according to claim 1, wherein the parameters of and a representing the range of values of the secure batch mapping map$_1$ are taken as $\alpha_1$=0 and $\alpha_K$=2$^{b−y}$, respectively (where b$_y$ represents the number of bits in a fractional portion of fixed point representing accuracy of an output of the softmax function).

* * * * *